US010397757B1

(12) United States Patent
Gratton et al.

(10) Patent No.: US 10,397,757 B1
(45) Date of Patent: *Aug. 27, 2019

(54) DERIVING SIGNAL LOCATION FROM SIGNAL CONTENT

(71) Applicant: Banjo, Inc., Park City, UT (US)

(72) Inventors: Christian Gratton, Las Vegas, NV (US); Rish Mehta, Redwood City, CA (US); Damien Patton, Park City, UT (US); K W Justin Leung, Redwood City, CA (US); Cameron Holt, Salt Lake City, UT (US)

(73) Assignee: Banjo, Inc., Park City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/388,570

(22) Filed: Apr. 18, 2019

Related U.S. Application Data

(63) Continuation of application No. 16/106,530, filed on Aug. 21, 2018.
(Continued)

(51) Int. Cl.
*H04W 4/18* (2009.01)
*H04W 88/02* (2009.01)
(Continued)

(52) U.S. Cl.
CPC ............ *H04W 4/185* (2013.01); *G06F 16/29* (2019.01); *G06F 17/278* (2013.01); *H04W 4/02* (2013.01);
(Continued)

(58) Field of Classification Search
CPC ......... H04W 4/18; H04W 88/02; H04W 4/02; H04W 64/00; H04W 4/20; H04W 88/08; H04W 4/029; H04W 4/38; H04W 4/021; H04W 12/1004; H04W 36/0061; H04W 36/00835; H04W 4/185; H04W 64/006; H04W 4/023; H04W 64/003; H04W 4/025; H04W 76/00; H04W 12/00503; H04W 36/38; H04W 92/12; H04W 76/11; H04W 12/0017; H04W 88/00; G06F 17/27;
(Continued)

(56) References Cited

U.S. PATENT DOCUMENTS 8,782,041 B1 * 7/2014 Daniel .......................... 707/724
8,830,054 B2 * 9/2014 Weiss ................... G08B 25/016
(Continued)

*Primary Examiner* — Meless N Zewdu
(74) *Attorney, Agent, or Firm* — Michael B. Dodd; R. Jace Hirschi

(57) ABSTRACT

The present invention extends to methods, systems, and computer program products for deriving signal location from signal content. In general, signal ingestion modules ingest different types of raw structured and/or raw unstructured signals on an ongoing basis. The signal ingestion modules normalize raw signals to form normalized signals. In one aspect, a raw signal is ingested. A derived signal is derived from the raw signal. A list of one or more geo cells where the raw signal potentially originated is accessed. A location annotation identifying a geo cell from among the one or more geo cells is formulated. The derived signal is annotated with the location annotation. A location in a two dimensional space is determined from the location annotation. The location is inserted into the derived signal forming a normalized signal.

18 Claims, 14 Drawing Sheets

Related U.S. Application Data

(60) Provisional application No. 62/664,001, filed on Apr. 27, 2018, provisional application No. 62/667,616, filed on May 7, 2018, provisional application No. 62/673,827, filed on May 18, 2018, provisional application No. 62/673,828, filed on May 18, 2018, provisional application No. 62/686,791, filed on Jun. 19, 2018.

(51) Int. Cl.

| | | |
|---|---|---|
| *H04W 4/02* | (2018.01) | |
| *H04W 64/00* | (2009.01) | |
| *H04W 4/20* | (2018.01) | |
| *H04W 88/08* | (2009.01) | |
| *G06F 16/29* | (2019.01) | |
| *H04W 4/029* | (2018.01) | |
| *H04W 4/38* | (2018.01) | |
| *H04W 4/021* | (2018.01) | |
| *G06F 17/27* | (2006.01) | |
| *H04W 88/00* | (2009.01) | |
| *H04W 36/00* | (2009.01) | |
| *H04W 12/00* | (2009.01) | |
| *H04W 76/11* | (2018.01) | |
| *H04W 92/12* | (2009.01) | |
| *H04W 36/38* | (2009.01) | |
| *H04W 76/00* | (2018.01) | |
| *H04W 12/10* | (2009.01) | |

(52) U.S. Cl.
CPC ............ *H04W 4/021* (2013.01); *H04W 4/023* (2013.01); *H04W 4/025* (2013.01); *H04W 4/029* (2018.02); *H04W 4/18* (2013.01); *H04W 4/20* (2013.01); *H04W 4/38* (2018.02); *H04W 64/00* (2013.01); *H04W 64/003* (2013.01); *H04W 64/006* (2013.01); *H04W 88/02* (2013.01); *H04W 88/08* (2013.01); *H04W 12/0017* (2019.01); *H04W 12/00503* (2019.01); *H04W 12/1004* (2019.01); *H04W 36/00835* (2018.08); *H04W 36/38* (2013.01); *H04W 76/00* (2013.01); *H04W 76/11* (2018.02); *H04W 88/00* (2013.01); *H04W 92/12* (2013.01)

(58) Field of Classification Search
CPC ...... G06F 16/29; G06F 16/387; G06F 16/487; G06F 17/241; G06F 17/278; G06F 16/24573; G06F 16/2455; G06F 16/24575; G06F 16/383; G06F 16/909; G06K 9/3258; G06K 9/00228; G06K 9/6298; G06K 9/42
See application file for complete search history.

(56) References Cited

U.S. PATENT DOCUMENTS

| | | | |
|---|---|---|---|
| 9,894,169 B2* | 2/2018 | Sheinfeld | H04L 67/22 |
| 10,057,349 B2* | 8/2018 | Kodner et al. | H04L 67/1097 |
| 10,212,572 B1* | 2/2019 | Patton et al. | H04W 4/90 |
| 10,257,058 B1* | 4/2019 | Leung et al. | H04L 43/028 |
| 10,261,846 B1* | 4/2019 | Patton et al. | G06F 9/542 |
| 10,268,642 B1* | 4/2019 | Leung et al. | G06F 16/258 |
| 2006/0235833 A1* | 10/2006 | Smith et al. | 707/3 |
| 2013/0214925 A1* | 8/2013 | Weiss | 340/539.11 |
| 2014/0067951 A1* | 3/2014 | Sheinfeld | H04L 67/22 |
| 2017/0142200 A1* | 5/2017 | Kodner et al. | H04L 67/1097 |

* cited by examiner

DERIVING SIGNAL LOCATION FROM SIGNAL CONTENT

CROSS-REFERENCE TO RELATED APPLICATIONS

This application is a Continuation of U.S. patent application Ser. No. 16/106,530, entitled "Deriving Signal Location From Signal Content", filed Aug. 21, 2018, which is incorporated herein in its entirety. This application claims the benefit of U.S. Provisional Patent Application Ser. No. 62/664,001, entitled "Normalizing Different Types Of Ingested Signals Into A Common Format", filed Apr. 27, 2018, which is incorporated herein in its entirety. This application claims the benefit of U.S. Provisional Patent Application Ser. No. 62/667,616, entitled "Normalizing Different Types Of Ingested Signals Into A Common Format", filed May 7, 2018, which is incorporated herein in its entirety. This application claims the benefit of U.S. Provisional Patent Application Ser. No. 62/673,827 entitled "Inferring Signal Location From Named Entities Recognized In Signal Content", filed May 18, 2018, which is incorporated herein in its entirety. This application claims the benefit of U.S. Provisional Patent Application Ser. No. 62/673,828 entitled "Inferring More Precise Signal Location From Named Entities Recognized In Signal Content", filed May 18, 2018, which is incorporated herein in its entirety. This application claims the benefit of U.S. Provisional Patent Application Ser. No. 62/686,791, entitled, "Normalizing Signals", filed Jun. 19, 2018, which is incorporated herein in its entirety.

BACKGROUND

1. Background and Relevant Art

Data provided to computer systems can come from any number of different sources, such as, for example, user input, files, databases, applications, sensors, social media systems, cameras, emergency communications, etc. In some environments, computer systems receive (potentially large volumes of) data from a variety of different domains and/or verticals in a variety of different formats. When data is received from different sources and/or in different formats, it can be difficult to efficiently and effectively derive intelligence from the data.

For example, it can be difficult to determine geographically where data originated and if different portions of data from different sources originated in nearby locations. Some data can be associated with a location, while other data is not associated with a location. Further, location can be represented in a variety of different formats and precisions.

BRIEF SUMMARY

Examples extend to methods, systems, and computer program products for deriving signal location from signal content.

In general, signal ingestion modules ingest different types of raw structured and/or raw unstructured signals on an ongoing basis. The signal ingestion modules normalize raw signals to form normalized signals.

In one aspect, a raw signal is ingested. A derived signal is derived from the raw signal. A list of one or more geo cells where the raw signal potentially originated is accessed. A location annotation identifying a geo cell from among the one or more geo cells is formulated.

The derived signal is annotated with the location annotation. A location in a two dimensional space is determined from the location annotation. The location is inserted into the derived signal forming a normalized signal.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1A:
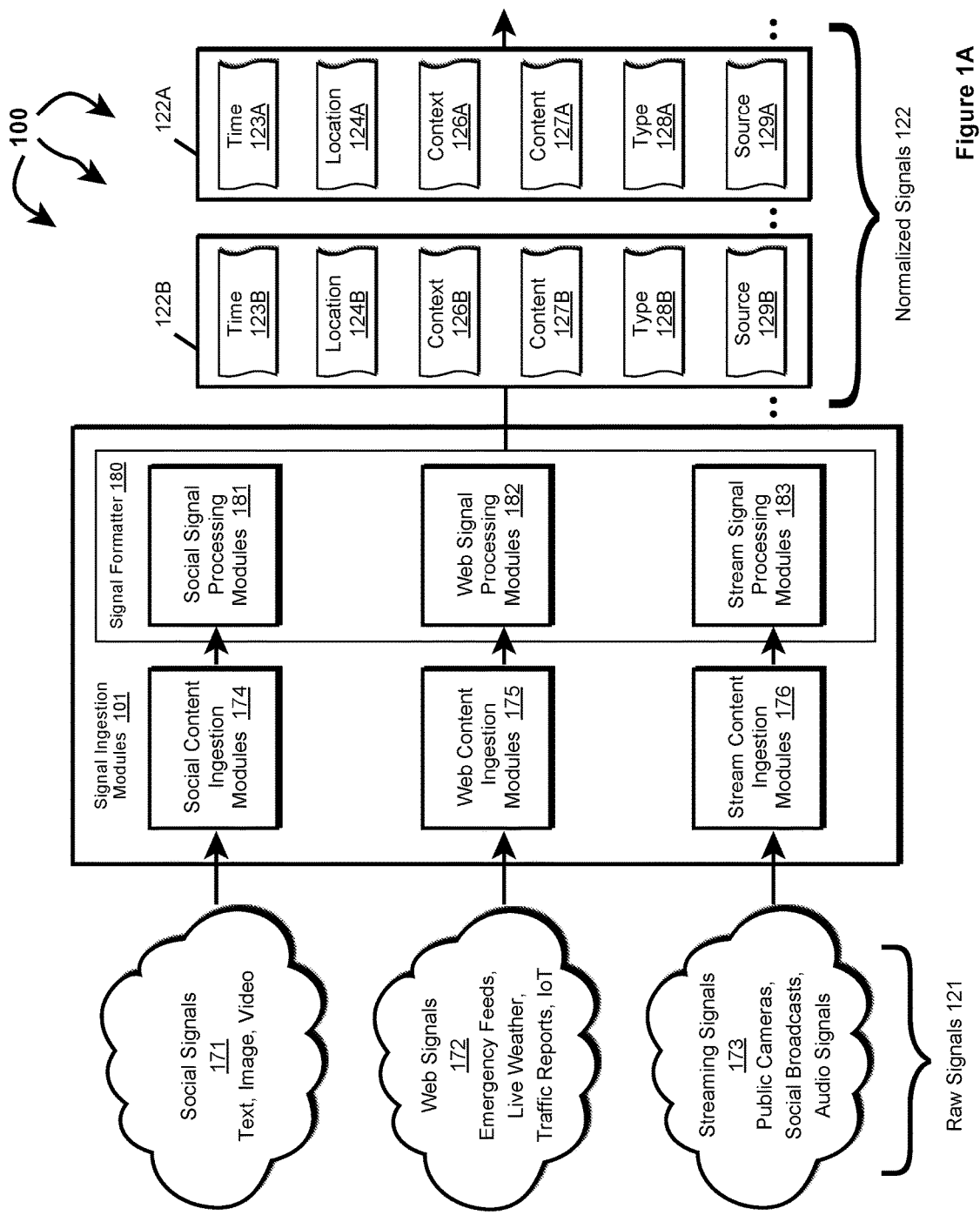
FIG. 1A illustrates an example computer architecture that facilitates normalizing ingesting signals.

Examples extend to methods, systems, and computer program products for deriving signal location from signal content.

Entities (e.g., parents, other family members, guardians, friends, teachers, social workers, first responders, hospitals, delivery services, media outlets, government entities, etc.) may desire to be made aware of relevant events as close as possible to the events' occurrence (i.e., as close as possible to "moment zero"). Different types of ingested signals (e.g., social media signals, web signals, and streaming signals) can be used to detect events.

In general, signal ingestion modules ingest different types of raw structured and/or raw unstructured signals on an ongoing basis. Different types of signals can include different data media types and different data formats. Data media types can include audio, video, image, and text. Different formats can include text in XML, text in JavaScript Object Notation (JSON), text in RSS feed, plain text, video stream in Dynamic Adaptive Streaming over HTTP (DASH), video stream in HTTP Live Streaming (HLS), video stream in Real-Time Messaging Protocol (RTMP), other Multipurpose Internet Mail Extensions (MIME) types, etc. Handling different types and formats of data introduces inefficiencies into subsequent event detection processes, including when determining if different signals relate to the same event.

Accordingly, the signal ingestion modules can normalize raw signals across multiple data dimensions to form normalized signals. Each dimension can be a scalar value or a vector of values. In one aspect, raw signals are normalized into normalized signals having a Time, Location, Context (or "TLC") dimensions.

A Time (T) dimension can include a time of origin or alternatively a "event time" of a signal. A Location (L) dimension can include a location anywhere across a geographic area, such as, a country (e.g., the United States), a State, a defined area, an impacted area, an area defined by a geo cell, an address, etc.

A Context (C) dimension indicates circumstances surrounding formation/origination of a raw signal in terms that facilitate understanding and assessment of the raw signal. The Context (C) dimension of a raw signal can be derived from express as well as inferred signal features of the raw signal.

Signal ingestion modules can include one or more single source classifiers. A single source classifier can compute a single source probability for a raw signal from features of the raw signal. A single source probability can reflect a mathematical probability or approximation of a mathematical probability (e.g., a percentage between 0%-100%) of an event actually occurring. A single source classifier can be configured to compute a single source probability for a single event type or to compute a single source probability for each of a plurality of different event types. A single source classifier can compute a single source probability using artificial intelligence, machine learning, neural networks, logic, heuristics, etc.

As such, single source probabilities and corresponding probability details can represent a Context (C) dimension. Probability details can indicate (e.g., can include a hash field indicating) a probabilistic model and (express and/or inferred) signal features considered in a signal source probability calculation.

Thus, per signal type, signal ingestion modules determine Time (T), a Location (L), and a Context (C) dimensions associated with a signal. Different ingestion modules can be utilized/tailored to determine T, L, and C dimensions associated with different signal types. Normalized (or "TLC") signals can be forwarded to an event detection infrastructure. When signals are normalized across common dimensions subsequent event detection is more efficient and more effective.

Normalization of ingestion signals can include dimensionality reduction. Generally, "transdimensionality" transformations can be structured and defined in a "TLC" dimensional model. Signal ingestion modules can apply the "transdimensionality" transformations to generic source data in raw signals to re-encode the source data into normalized data having lower dimensionality. Thus, each normalized signal can include a T vector, an L vector, and a C vector. At lower dimensionality, the complexity of measuring "distances" between dimensional vectors across different normalized signals is reduced.

More specifically, a Location dimension can be derived from other signal characteristics, such as, signal content. Signal ingestion modules can ingest a raw signal. In one aspect, the raw signal lacks express location information. In another aspect, a raw signal includes some express location information, such as, a region identifier and/or other hint, such as, a city name. However, the express location information and/or hint is insufficient for determining a Location dimension.

The signal ingestion modules recognize one or more named entities (e.g., multiple organizations) from characteristics of the raw signal, such as, content included in the raw signal. The signal ingestion modules query a geo cell database with the one or more recognized named entities. In one aspect, express location information, such as, the region identifier and/or other hint, such as, a city name, is included in the query.

One or more geo cells (potentially narrowed down using the express location information and/or other hints) are returned from the geo cell database. In one aspect, a single geo cell is returned from the geo cell database. In another aspect, a plurality of geo cells is returned from the geo cell database. The signal ingestion modules listen for additional raw signals originating in the single geo cell or originating in any of the plurality of geo cells. When an additional raw signal is ingested from a geo cell included in a plurality of geo cells, it increases the likelihood that the original raw signal originated the geo cell.

In one aspect, the raw signal is partially normalized (e.g., includes a Time dimension and/or Context dimension) prior to querying the geo cell database. The signal ingestion modules ingest another raw signal and detect that the other raw signal originating in the signal geo cell or in one of the plurality of geo cells. The signal ingestion modules determine a Context dimension for the other raw signal. The signal ingestion modules determine that Context dimensions of the ingested signal and the other ingested signal are sufficiently similar (and this have increased chance of relating to the same event).

The signal ingestion modules derive location annotations for the ingested signal based on the originating geo cell of the other ingested signal. The signal ingestion modules annotate the partially normalized (e.g., TC) signal with the location annotations. The signal ingestion modules determine a Location dimension from the location annotations. The signal ingestion modules insert the Location dimension into the partially normalized (e.g., TC) signal to form a normalized (e.g., TLC) signal.

In one aspect, signal content is text. In another aspect, signal content is an image. The signal ingestion modules identify characters in the image and convert the characters to text (e.g., using Optical Character Recognition (OCR)). In a further aspect, signal content is audio. The signal ingestion modules transcribe the audio into text. The signal ingestion modules recognize one or more named entities, such as, for example, a business, an organization, a place, or a street, within the text.

Concurrently with signal ingestion, an event detection infrastructure considers features of different combinations of normalized signals to attempt to identify events of interest to various parties. For example, the event detection infrastructure can determine that features of multiple different normalized signals collectively indicate an event of interest to one or more parties. Alternately, the event detection infrastructure can determine that features of one or more normalized signals indicate a possible event of interest to one or more parties. The event detection infrastructure then determines that features of one or more other normalized signals validate the possible event as an actual event of interest to the one or more parties. Signal features can include: signal type, signal source, signal content, Time (T) dimension, Location (L) dimension, Context (C) dimension, other circumstances of signal creation, etc.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: raw signals, normalized signals, partially normalized signals, signal features, single source probabilities, times, time dimensions, locations, location dimensions, geo cells, geo cell entries, geo cell queries, region identifiers, designated market areas (DMAs), region IDs, hints, contexts, location annotations, context annotations, classification tags, context dimensions, events, named entities, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, raw signals, normalized signals, partially normalized signals, signal features, single source probabilities, times, time dimensions, locations, location dimensions, geo cells, geo cell entries, geo cell queries, region identifiers, designated market areas (DMAs), regions IDs, hints, contexts, location annotations, context annotations, classification tags, context dimensions, events, named entities, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "geo cell" is defined as a piece of "cell" in a spatial grid in any form. In one aspect, geo cells are arranged in a hierarchical structure. Cells of different geometries can be used.

A "geohash" is an example of a "geo cell".

In this description and the following claims, "geohash" is defined as a geocoding system which encodes a geographic location into a short string of letters and digits. Geohash is a hierarchical spatial data structure which subdivides space into buckets of grid shape (e.g., a square). Geohashes offer properties like arbitrary precision and the possibility of gradually removing characters from the end of the code to reduce its size (and gradually lose precision). As a consequence of the gradual precision degradation, nearby places will often (but not always) present similar prefixes. The longer a shared prefix is, the closer the two places are. geo cells can be used as a unique identifier and to approximate point data (e.g., in databases).

In one aspect, a "geohash" is used to refer to a string encoding of an area or point on the Earth. The area or point on the Earth may be represented (among other possible coordinate systems) as a latitude/longitude or Easting/Northing—the choice of which is dependent on the coordinate system chosen to represent an area or point on the Earth. geo cell can refer to an encoding of this area or point, where the geo cell may be a binary string comprised of 0s and 1s corresponding to the area or point, or a string comprised of 0s, 1s, and a ternary character (such as X)—which is used to refer to a don't care character (0 or 1). A geo cell can also be represented as a string encoding of the area or point, for example, one possible encoding is base-32, where every 5 binary characters are encoded as an ASCII character.

Depending on latitude, the size of an area defined at a specified geo cell precision can vary. When geohash is used for spatial indexing, the areas defined at various geo cell precisions are approximately:

TABLE 1

Example Areas at Various Geohash Precisions

| geo hash Length/Precision | width × height |
|---|---|
| 1 | 5,009.4 km × 4,992.6 km |
| 2 | 1,252.3 km × 624.1 km |
| 3 | 156.5 km × 156 km |
| 4 | 39.1 km × 19.5 km |
| 5 | 4.9 km × 4.9 km |
| 6 | 1.2 km × 609.4 m |
| 7 | 152.9 m × 152.4 m |
| 8 | 38.2 m × 19 m |
| 9 | 4.8 m × 4.8 m |
| 10 | 1.2 m × 59.5 cm |
| 11 | 14.9 cm × 14.9 cm |
| 12 | 3.7 cm × 1.9 cm |

Other geo cell geometries, such as, hexagonal tiling, triangular tiling, etc. are also possible. For example, the H3 geospatial indexing system is a multi-precision hexagonal tiling of a sphere (such as the Earth) indexed with hierarchical linear indexes.

In another aspect, geo cells are a hierarchical decomposition of a sphere (such as the Earth) into representations of regions or points based a Hilbert curve (e.g., the S2 hierarchy or other hierarchies). Regions/points of the sphere can be projected into a cube and each face of the cube includes a quad-tree where the sphere point is projected into. After that, transformations can be applied and the space discretized. The geo cells are then enumerated on a Hilbert Curve (a space-filling curve that converts multiple dimensions into one dimension and preserves the approximate locality).

Due to the hierarchical nature of geo cells, any signal, event, entity, etc., associated with a geo cell of a specified precision is by default associated with any less precise geo cells that contain the geo cell. For example, if a signal is associated with a geo cell of precision 9, the signal is by default also associated with corresponding geo cells of precisions 1, 2, 3, 4, 5, 6, 7, and 8. Similar mechanisms are applicable to other tiling and geo cell arrangements. For example, S2 has a cell level hierarchy ranging from level zero (85,011,012 km$^2$) to level 30 (between 0.48 cm$^2$ to 0.96 cm$^2$).

Signal Ingestion and Normalization

Signal ingestion modules ingest a variety of raw structured and/or raw unstructured signals on an on going basis and in essentially real-time. Raw signals can include social posts, live broadcasts, traffic camera feeds, other camera feeds (e.g., from other public cameras or from CCTV cameras), listening device feeds, 911 calls, weather data, planned events, IoT device data, crowd sourced traffic and road information, satellite data, air quality sensor data, smart city sensor data, public radio communication (e.g., among first responders and/or dispatchers, between air traffic controllers and pilots), etc. The content of raw signals can include images, video, audio, text, etc.

In general, signal normalization can prepare (or pre-process) raw signals into normalized signals to increase efficiency and effectiveness of subsequent computing activities, such as, event detection, event notification, etc., that utilize the normalized signals. For example, signal ingestion modules can normalize raw signals into normalized signals having a Time, Location, and Context (TLC) dimensions. An event detection infrastructure can use the Time, Location, and Content dimensions to more efficiently and effectively detect events.

Per signal type and signal content, different normalization modules can be used to extract, derive, infer, etc. Time, Location, and Context dimensions from/for a raw signal. For example, one set of normalization modules can be configured to extract/derive/infer Time, Location and Context dimensions from/for social signals. Another set of normalization modules can be configured to extract/derive/infer Time, Location and Context dimensions from/for Web signals. A further set of normalization modules can be configured to extract/derive/infer Time, Location and Context dimensions from/for streaming signals.

Normalization modules for extracting/deriving/inferring Time, Location, and Context dimensions can include text processing modules, NLP modules, image processing modules, video processing modules, etc. The modules can be used to extract/derive/infer data representative of Time, Location, and Context dimensions for a signal. Time, Location, and Context dimensions for a signal can be extracted/derived/inferred from metadata and/or content of the signal.

For example, NLP modules can analyze metadata and content of a sound clip to identify a time, location, and keywords (e.g., fire, shooter, etc.). An acoustic listener can also interpret the meaning of sounds in a sound clip (e.g., a gunshot, vehicle collision, etc.) and convert to relevant context. Live acoustic listeners can determine the distance and direction of a sound. Similarly, image processing modules can analyze metadata and pixels in an image to identify a time, location and keywords (e.g., fire, shooter, etc.). Image processing modules can also interpret the meaning of parts of an image (e.g., a person holding a gun, flames, a store logo, etc.) and convert to relevant context. Other modules can perform similar operations for other types of content including text and video.

Per signal type, each set of normalization modules can differ but may include at least some similar modules or may share some common modules. For example, similar (or the same) image analysis modules can be used to extract named entities from social signal images and public camera feeds. Likewise, similar (or the same) NLP modules can be used to extract named entities from social signal text and web text.

In some aspects, an ingested signal includes sufficient expressly defined time, location, and context information upon ingestion. The expressly defined time, location, and context information is used to determine Time, Location, and Context dimensions for the ingested signal. In other aspects, an ingested signal lacks expressly defined location information or expressly defined location information is insufficient (e.g., lacks precision) upon ingestion. In these other aspects, Location dimension or additional Location dimension can be inferred from features of an ingested signal and/or through references to other data sources. In further aspects, an ingested signal lacks expressly defined context information or expressly defined context information is insufficient (e.g., lacks precision) upon ingestion. In these further aspects, Context dimension or additional Context dimension can be inferred from features of an ingested signal and/or through reference to other data sources.

In further aspects, time information may not be included, or included time information may not be given with high enough precision and Time dimension is inferred. For example, a user may post an image to a social network which had been taken some indeterminate time earlier.

Normalization modules can use named entity recognition and reference to a geo cell database to infer Location dimension. Named entities can be recognized in text, images, video, audio, or sensor data. The recognized named entities can be compared to named entities in geo cell entries. Matches indicate possible signal origination in a geographic area defined by a geo cell.

As such, a normalized signal can include a Time dimension, a Location dimension, a Context dimension (e.g., single source probabilities and probability details), a signal type, a signal source, and content.

A single source probability can be calculated by single source classifiers (e.g., machine learning models, artificial intelligence, neural networks, statistical models, etc.) that consider hundreds, thousands, or even more signal features of a signal. Single source classifiers can be based on binary models and/or multi-class models.

FIG. 1A depicts part of computer architecture 100 that facilitates ingesting and normalizing signals. As depicted, computer architecture 100 includes signal ingestion modules 101, social signals 171, Web signals 172, and streaming signals 173. Signal ingestion modules 101, social signals 171, Web signals 172, and streaming signals 173 can be connected to (or be part of) a network, such as, for example, a system bus, a Local Area Network ("LAN"), a Wide Area Network ("WAN"), and even the Internet. Accordingly, signal ingestion modules 101, social signals 171, Web signals 172, and streaming signals 173 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Signal ingestion module(s) 101 can ingest raw signals 121, including social signals 171, web signals 172, and streaming signals 173 (e.g., social posts, traffic camera feeds, other camera feeds, listening device feeds, 911 calls, weather data, planned events, IoT device data, crowd sourced traffic and road information, satellite data, air quality sensor data, smart city sensor data, public radio communication, etc.) on going basis and in essentially real-time. Signal ingestion module(s) 101 include social content ingestion modules 174, web content ingestion modules 175, stream content ingestion modules 176, and signal formatter 180. Signal formatter 180 further includes social signal processing module 181, web signal processing module 182, and stream signal processing modules 183.

For each type of signal, a corresponding ingestion module and signal processing module can interoperate to normalize the signal into Time, Location, Context (TLC) dimensions. For example, social content ingestion modules 174 and social signal processing module 181 can interoperate to normalize social signals 171 into TLC dimensions. Similarly, web content ingestion modules 175 and web signal processing module 182 can interoperate to normalize web signals 172 into TLC dimensions. Likewise, stream content ingestion modules 176 and stream signal processing modules 183 can interoperate to normalize streaming signals 173 into TLC dimensions.

Signal content exceeding specified size requirements (e.g., audio or video) can be cached upon ingestion. Signal ingestion modules 101 include a URL or other identifier to the cached content within the context for the signal.

In one aspect, signal formatter 180 includes modules for determining a single source probability as a ratio of signals turning into events based on the following signal properties: (1) event class (e.g., fire, accident, weather, etc.), (2) media type (e.g., text, image, audio, etc.), (3) source (e.g., twitter, traffic camera, first responder radio traffic, etc.), and (4) geo type (e.g., geo cell, region, or non-geo). Probabilities can be stored in a lookup table for different combinations of the signal properties. Features of a signal can be derived and used to query the lookup table. For example, the lookup table can be queried with terms ("accident", "image", "twitter", "region"). The corresponding ratio (probability) can be returned from the table.

In another aspect, signal formatter 180 includes a plurality of single source classifiers (e.g., artificial intelligence, machine learning modules, neural networks, etc.). Each single source classifier can consider hundreds, thousands, or even more signal features of a signal. Signal features of a signal can be derived and submitted to a signal source classifier. The single source classifier can return a probability that a signal indicates a type of event. Single source classifiers can be binary classifiers or multi-source classifiers.

Raw classifier output can be adjusted to more accurately represent a probability that a signal is a "true positive". For example, 1,000 signals whose raw classifier output is 0.9 may include 80% as true positives. Thus, probability can be adjusted to 0.8 to reflect true probability of the signal being a true positive. "Calibration" can be done in such a way that for any "calibrated score" this score reflects the true probability of a true positive outcome.

Signal ingestion modules 101 can insert one or more single source probabilities and corresponding probability details into a normalized signal to represent Context (C). Probability details can indicate a probability version and features used to calculate the probability. In one aspect, a probability version and signal features are contained in a hash field.

Signal ingestion modules 101 can access "transdimensionality" transformations structured and defined in a "TLC" dimensional model. Signal ingestion modules 101 can apply the "transdimensionality" transformations to generic source data in raw signals to re-encode the source data into normalized data having lower dimensionality. Dimensionality reduction can include reducing dimensionality of a raw signal to a normalized signal including a T vector, an L vector, and a C vector. At lower dimensionality, the complexity of measuring "distances" between dimensional vectors across different normalized signals is reduced.

Thus, in general, any received raw signals can be normalized into normalized signals including a Time (T) dimension, a Location (L) dimension, a Context (C) dimension, signal source, signal type, and content. Signal ingestion modules 101 can send normalized signals 122 to event detection infrastructure 103.

For example, signal ingestion modules 101 can send normalized signal 122A, including time 123A, location 124A, context 126A, content 127A, type 128A, and source 129A to event detection infrastructure 103. Similarly, signal ingestion modules 101 can send normalized signal 122B, including time 123B, location 124B, context 126B, content 127B, type 128B, and source 129B to event detection infrastructure 103.

Event Detection

Figure 1B:
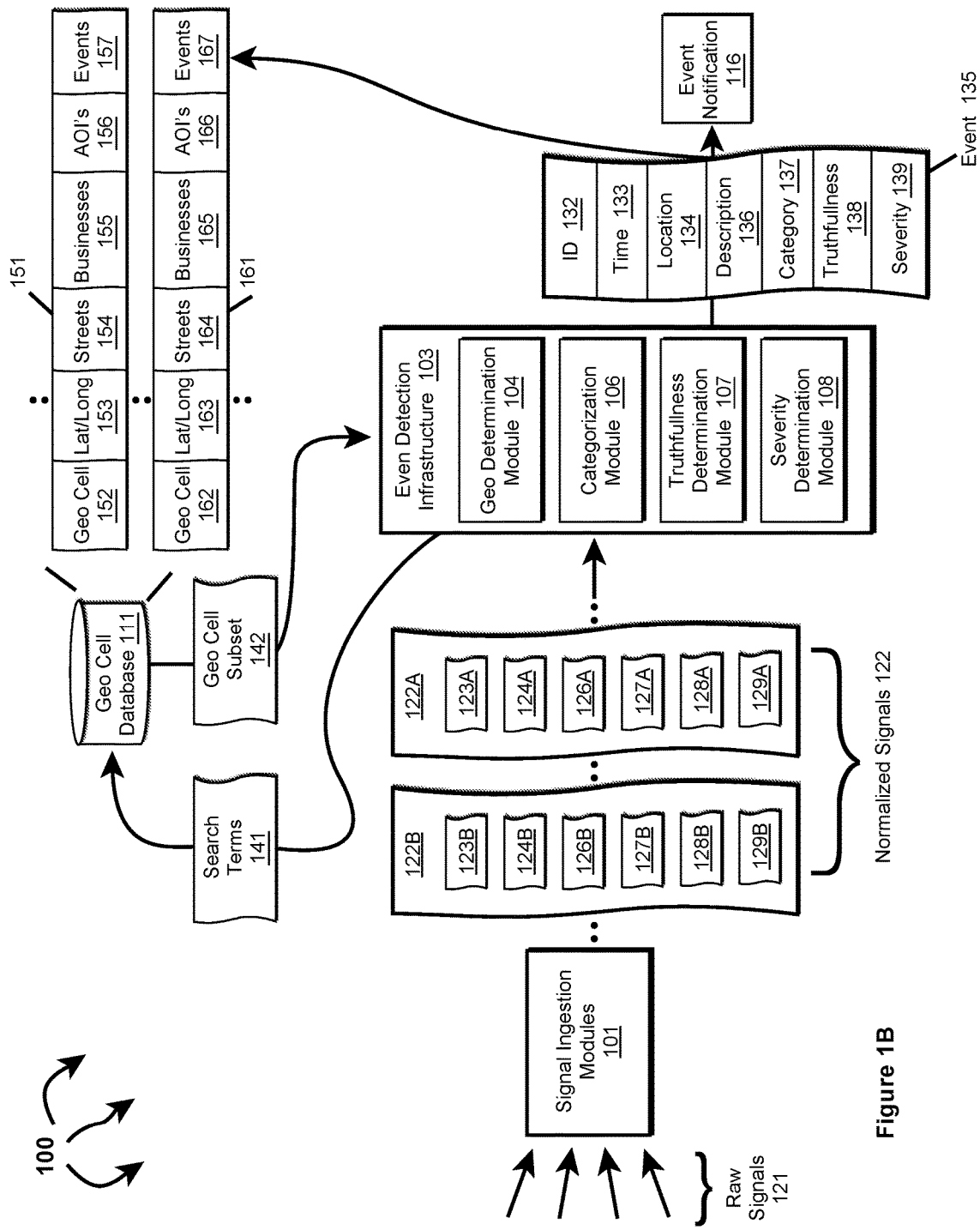
FIG. 1B illustrates an example computer architecture that facilitates detecting events from normalized signals.

FIG. 1B depicts part of computer architecture 100 that facilitates detecting events. As depicted, computer architecture 100 includes geo cell database 111 and even notification 116. Geo cell database 111 and event notification 116 can be connected to (or be part of) a network with signal ingestion modules 101 and event detection infrastructure 103. As such, geo cell database 111 and even notification 116 can create and exchange message related data over the network.

As described, in general, on an ongoing basis, concurrently with signal ingestion (and also essentially in real-time), event detection infrastructure 103 detects different categories of (planned and unplanned) events (e.g., fire, police response, mass shooting, traffic accident, natural disaster, storm, active shooter, concerts, protests, etc.) in different locations (e.g., anywhere across a geographic area, such as, the United States, a State, a defined area, an impacted area, an area defined by a geo cell, an address, etc.), at different times from Time, Location, and Context dimensions included in normalized signals. Since, normalized signals are normalized to include Time, Location, and Context dimensions, event detection infrastructure 103 can handle normalized signals in a more uniform manner increasing event detection efficiency and effectiveness.

Event detection infrastructure 103 can also determine an event truthfulness, event severity, and an associated geo cell. In one aspect, context information in a normalized signal increases the efficiency and effectiveness of determining truthfulness, severity, and an associated geo cell.

Generally, an event truthfulness indicates how likely a detected event is actually an event (vs. a hoax, fake, misinterpreted, etc.). Truthfulness can range from less likely to be true to more likely to be true. In one aspect, truthfulness is represented as a numerical value, such as, for example, from 1 (less truthful) to 10 (more truthful) or as percentage value in a percentage range, such as, for example, from 0% (less truthful) to 100% (more truthful). Other truthfulness representations are also possible. For example, truthfulness can be a dimension or represented by one or more vectors.

Generally, an event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations are also possible. For example, severity can be a dimension or represented by one or more vectors.

In general, event detection infrastructure 103 can include a geo determination module including modules for processing different kinds of content including location, time, context, text, images, audio, and video into search terms. The geo determination module can query a geo cell database with search terms formulated from normalized signal content. The geo cell database can return any geo cells having matching supplemental information. For example, if a search term includes a street name, a subset of one or more geo cells including the street name in supplemental information can be returned to the event detection infrastructure.

Event detection infrastructure 103 can use the subset of geo cells to determine a geo cell associated with an event location. Events associated with a geo cell can be stored back into an entry for the geo cell in the geo cell database. Thus, over time an historical progression of events within a geo cell can be accumulated.

As such, event detection infrastructure 103 can assign an event ID, an event time, an event location, an event category, an event description, an event truthfulness, and an event severity to each detected event. Detected events can be sent to relevant entities, including to mobile devices, to computer systems, to APIs, to data storage, etc.

Event detection infrastructure 103 detects events from information contained in normalized signals 122. Event detection infrastructure 103 can detect an event from a single normalized signal 122 or from multiple normalized signals 122. In one aspect, event detection infrastructure 103 detects an event based on information contained in one or more normalized signals 122. In another aspect, event detection infrastructure 103 detects a possible event based on information contained in one or more normalized signals 122. Event detection infrastructure 103 then validates the potential event as an event based on information contained in one or more other normalized signals 122.

As depicted, event detection infrastructure 103 includes geo determination module 104, categorization module 106, truthfulness determination module 107, and severity determination module 108.

Geo determination module 104 can include NLP modules, image analysis modules, etc. for identifying location information from a normalized signal. Geo determination module 104 can formulate (e.g., location) search terms 141 by using NLP modules to process audio, using image analysis modules to process images, etc. Search terms can include street addresses, building names, landmark names, location names, school names, image fingerprints, etc. Event detection infrastructure 103 can use a URL or identifier to access cached content when appropriate.

Categorization module 106 can categorize a detected event into one of a plurality of different categories (e.g., fire, police response, mass shooting, traffic accident, natural disaster, storm, active shooter, concerts, protests, etc.) based on the content of normalized signals used to detect and/or otherwise related to an event.

Truthfulness determination module 107 can determine the truthfulness of a detected event based on one or more of: source, type, age, and content of normalized signals used to detect and/or otherwise related to the event. Some signal types may be inherently more reliable than other signal types. For example, video from a live traffic camera feed may be more reliable than text in a social media post. Some signal sources may be inherently more reliable than others. For example, a social media account of a government agency may be more reliable than a social media account of an individual. The reliability of a signal can decay over time.

Severity determination module 108 can determine the severity of a detected event based on or more of: location, content (e.g., dispatch codes, keywords, etc.), and volume of normalized signals used to detect and/or otherwise related to an event. Events at some locations may be inherently more severe than events at other locations. For example, an event at a hospital is potentially more severe than the same event at an abandoned warehouse. Event category can also be considered when determining severity. For example, an event categorized as a "Shooting" may be inherently more severe than an event categorized as "Police Presence" since a shooting implies that someone has been injured.

Geo cell database 111 includes a plurality of geo cell entries. Each geo cell entry is included in a geo cell defining an area and corresponding supplemental information about things included in the defined area. The corresponding supplemental information can include latitude/longitude, street names in the area defined by and/or beyond the geo cell, businesses in the area defined by the geo cell, other Areas of Interest (AOIs) (e.g., event venues, such as, arenas, stadiums, theaters, concert halls, etc.) in the area defined by the geo cell, image fingerprints derived from images captured in the area defined by the geo cell, and prior events that have occurred in the area defined by the geo cell. For example, geo cell entry 151 includes geo cell 152, lat/lon 153, streets 154, businesses 155, AOIs 156, and prior events 157. Each event in prior events 157 can include a location (e.g., a street address), a time (event occurrence time), an event category, an event truthfulness, an event severity, and an event description. Similarly, geo cell entry 161 includes geo cell 162, lat/lon 163, streets 164, businesses 165, AOIs 166, and prior events 167. Each event in prior events 167 can include a location (e.g., a street address), a time (event occurrence time), an event category, an event truthfulness, an event severity, and an event description.

Other geo cell entries can include the same or different (more or less) supplemental information, for example, depending on infrastructure density in an area. For example, a geo cell entry for an urban area can contain more diverse supplemental information than a geo cell entry for an agricultural area (e.g., in an empty field).

Geo cell database 111 can store geo cell entries in a hierarchical arrangement based on geo cell precision. As such, geo cell information of more precise geo cells is included in the geo cell information for any less precise geo cells that include the more precise geo cell.

Geo determination module 104 can query geo cell database 111 with search terms 141. Geo cell database 111 can identify any geo cells having supplemental information that matches search terms 141. For example, if search terms 141 include a street address and a business name, geo cell database 111 can identify geo cells having the street name and business name in the area defined by the geo cell. Geo cell database 111 can return any identified geo cells to geo determination module 104 in geo cell subset 142.

Geo determination module can use geo cell subset 142 to determine the location of event 135 and/or a geo cell associated with event 135. As depicted, event 135 includes event ID 132, time 133, location 137, description 136, category 137, truthfulness 138, and severity 139.

Event detection infrastructure 103 can also determine that event 135 occurred in an area defined by geo cell 162 (e.g., a geohash having precision of level 7 or level 9). For example, event detection infrastructure 103 can determine that location 134 is in the area defined by geo cell 162. As such, event detection infrastructure 103 can store event 135 in events 167 (i.e., historical events that have occurred in the area defined by geo cell 162).

Event detection infrastructure 103 can also send event 135 to event notification module 116. Event notification module 116 can notify one or more entities about event 135.

Figure 2:
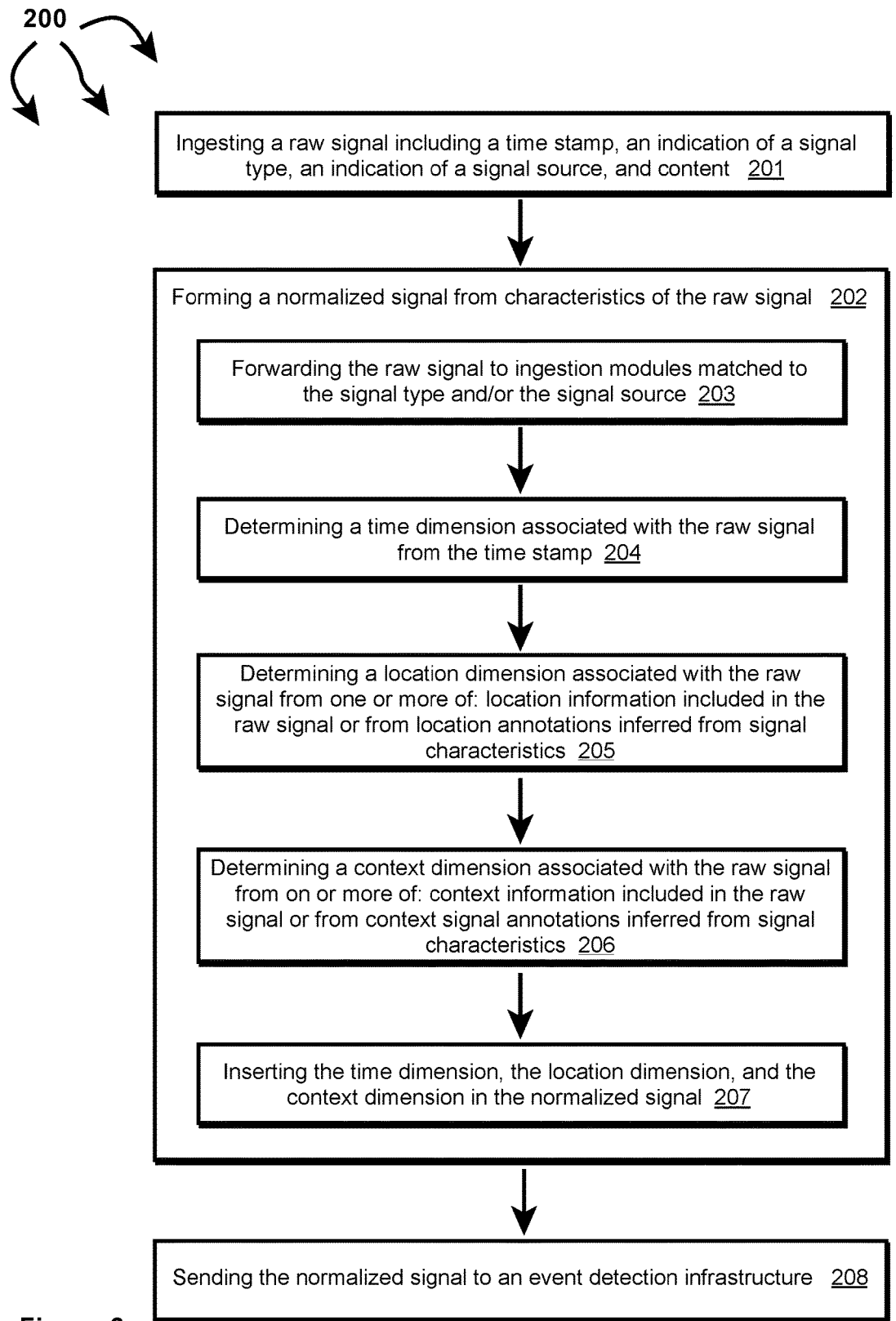
FIG. 2 illustrates a flow chart of an example method for normalizing ingested signals.

FIG. 2 illustrates a flow chart of an example method 200 for normalizing ingested signals. Method 200 will be described with respect to the components and data in computer architecture 100.

Method 200 includes ingesting a raw signal including a time stamp, an indication of a signal type, an indication of a signal source, and content (201). For example, signal ingestion modules 101 can ingest a raw signal 121 from one of: social signals 171, web signals 172, or streaming signals 173.

Method 200 includes forming a normalized signal from characteristics of the raw signal (202). For example, signal ingestion modules 101 can form a normalized signal 122A from the ingested raw signal 121.

Forming a normalized signal includes forwarding the raw signal to ingestion modules matched to the signal type and/or the signal source (203). For example, if ingested raw signal 121 is from social signals 171, raw signal 121 can be forwarded to social content ingestion modules 174 and social signal processing modules 181. If ingested raw signal 121 is from web signals 172, raw signal 121 can be forwarded to web content ingestion modules 175 and web signal processing modules 182. If ingested raw signal 121 is from streaming signals 173, raw signal 121 can be forwarded to streaming content ingestion modules 176 and streaming signal processing modules 183.

Forming a normalized signal includes determining a time dimension associated with the raw signal from the time stamp (204). For example, signal ingestion modules 101 can determine time 123A from a time stamp in ingested raw signal 121.

Forming a normalized signal includes determining a location dimension associated with the raw signal from one or more of: location information included in the raw signal or from location annotations inferred from signal characteristics (205). For example, signal ingestion modules 101 can determine location 124A from location information included in raw signal 121 or from location annotations derived from characteristics of raw signal 121 (e.g., signal source, signal type, signal content).

Forming a normalized signal includes determining a context dimension associated with the raw signal from one or more of: context information included in the raw signal or from context signal annotations inferred from signal characteristics (206). For example, signal ingestion modules 101 can determine context 126A from context information included in raw signal 121 or from context annotations derived from characteristics of raw signal 121 (e.g., signal source, signal type, signal content).

Forming a normalized signal includes inserting the time dimension, the location dimension, and the context dimension in the normalized signal (207). For example, signal ingestion modules 101 can insert time 123A, location 124A, and context 126A in normalized signal 122. Method 200 includes sending the normalized signal to an event detection infrastructure (208). For example, signal ingestion modules 101 can send normalized signal 122A to event detection infrastructure 103.

Figure 3A:
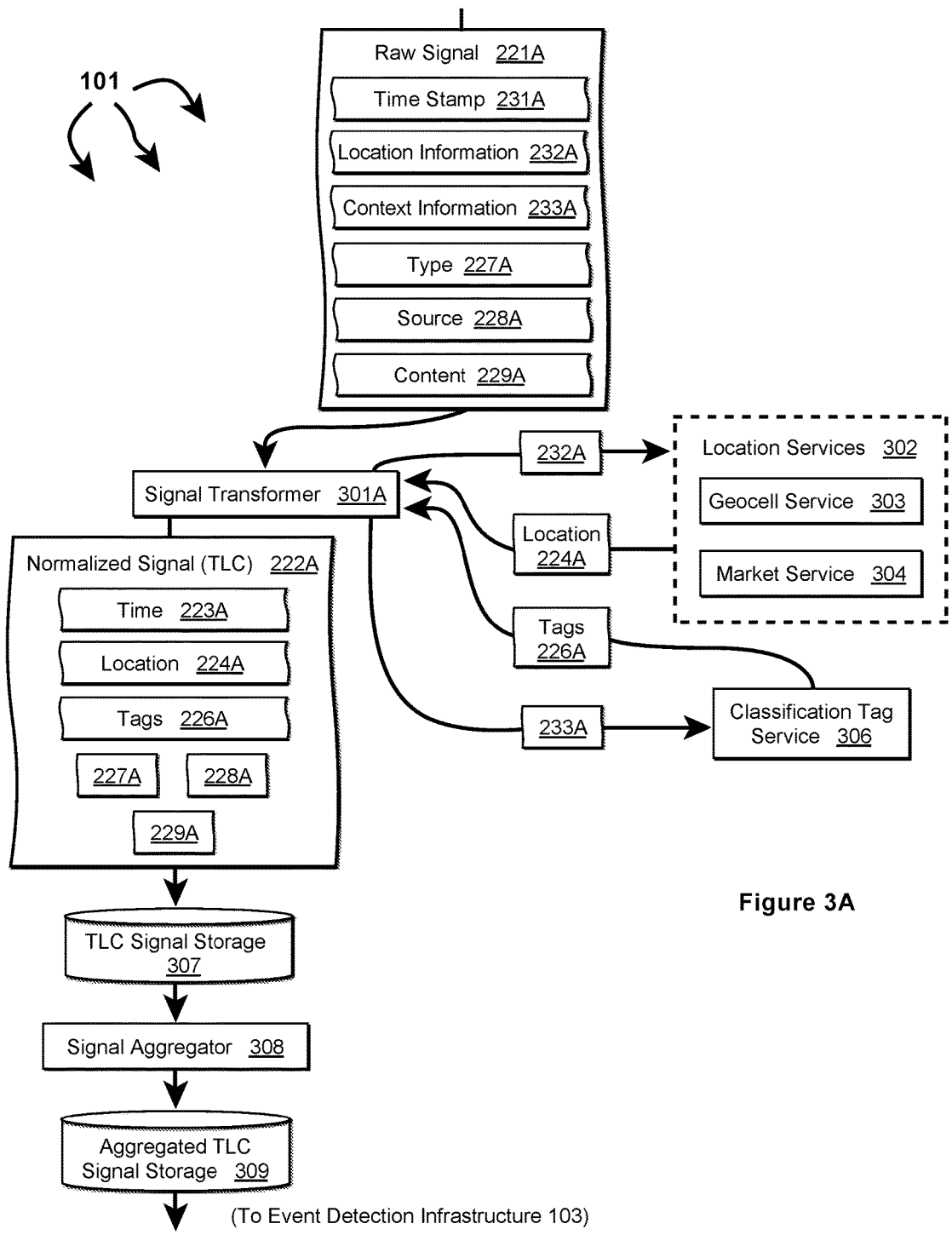
FIGS. 3A, 3B, 3C, and 3D illustrate other example components that can be included in signal ingestion modules.
Figure 3B:
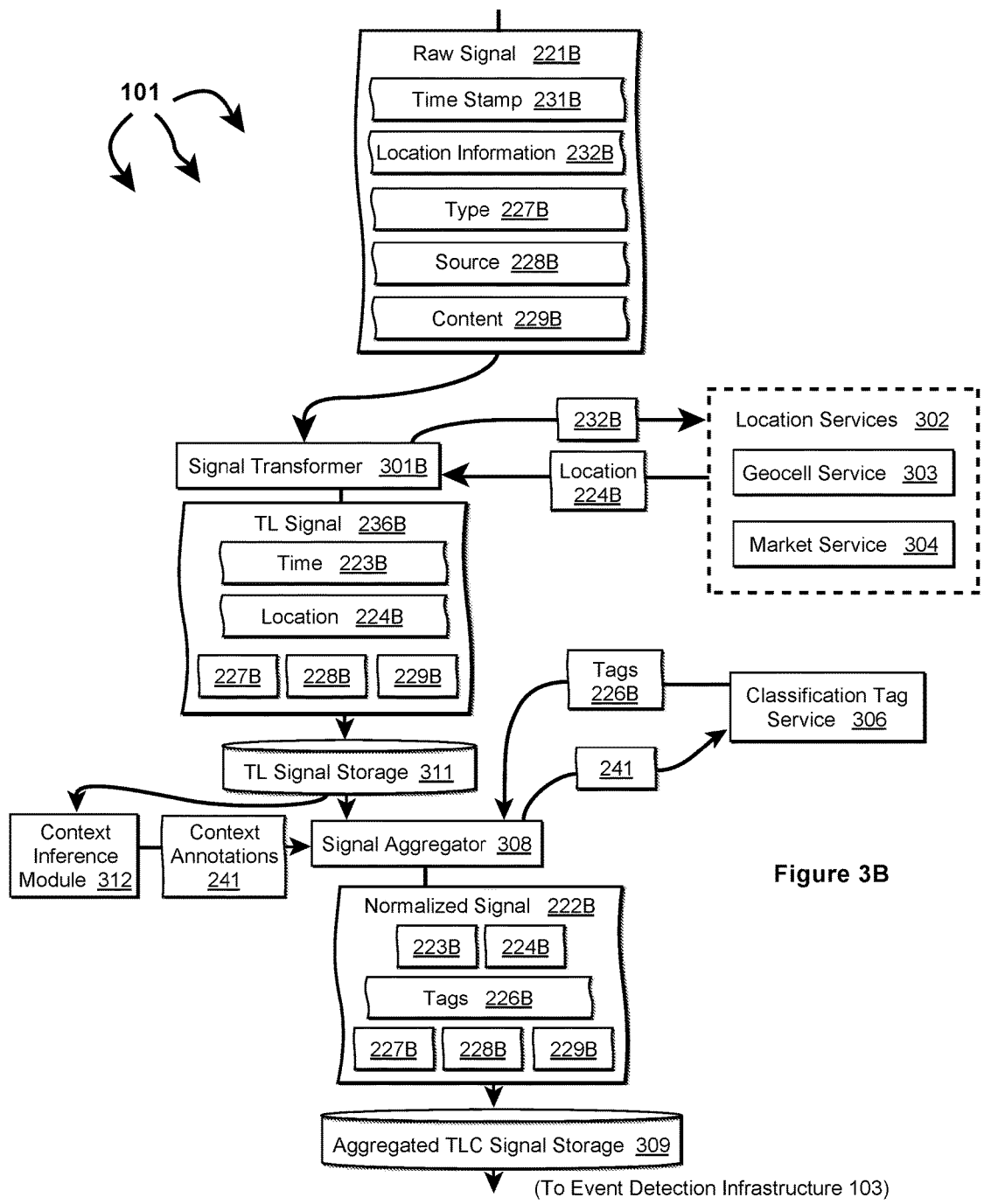
Figure 3C:
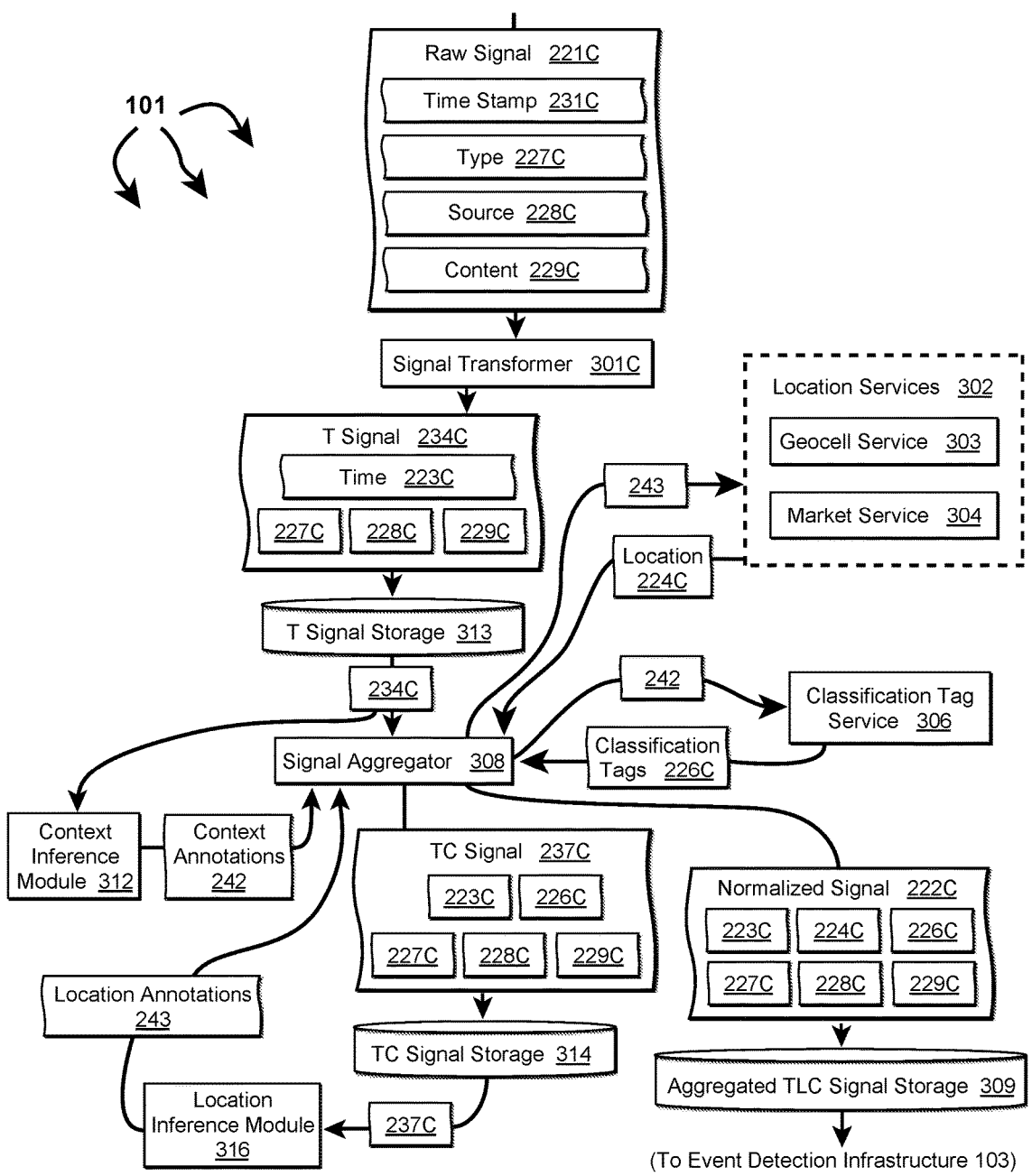

FIGS. 3A, 3B, and 3C depict other example components that can be included in signal ingestion modules 101. Signal ingestion modules 101 can include signal transformers for different types of signals including signal transformer 301A (for TLC signals), signal transformer 301B (for TL signals), and signal transformer 301C (for T signals). In one aspect, a single module combines the functionality of multiple different signal transformers.

Signal ingestion modules 101 can also include location services 302, classification tag service 306, signal aggregator 308, context inference module 312, and location inference module 316. Location services 302, classification tag service 306, signal aggregator 308, context inference module 312, and location inference module 316 or parts thereof can interoperate with and/or be integrated into any of ingestion modules 174, web content ingestion modules 175, stream content ingestion modules 176, social signal processing module 181, web signal processing module 182, and stream signal processing modules 183. Location services 302, classification tag service 306, signal aggregator 308, context inference module 312, and location inference module 316 can interoperate to implement "transdimensionality" transformations to reduce raw signal dimensionality.

Signal ingestion modules 101 can also include storage for signals in different stages of normalization, including TLC signal storage 307, TL signal storage 311, T signal storage 313, TC signal storage 314, and aggregated TLC signal storage 309. In one aspect, data ingestion modules 101 implement a distributed messaging system. Each of signal storage 307, 309, 311, 313, and 314 can be implemented as a message container (e.g., a topic) associated with a type of message.

Figure 4:
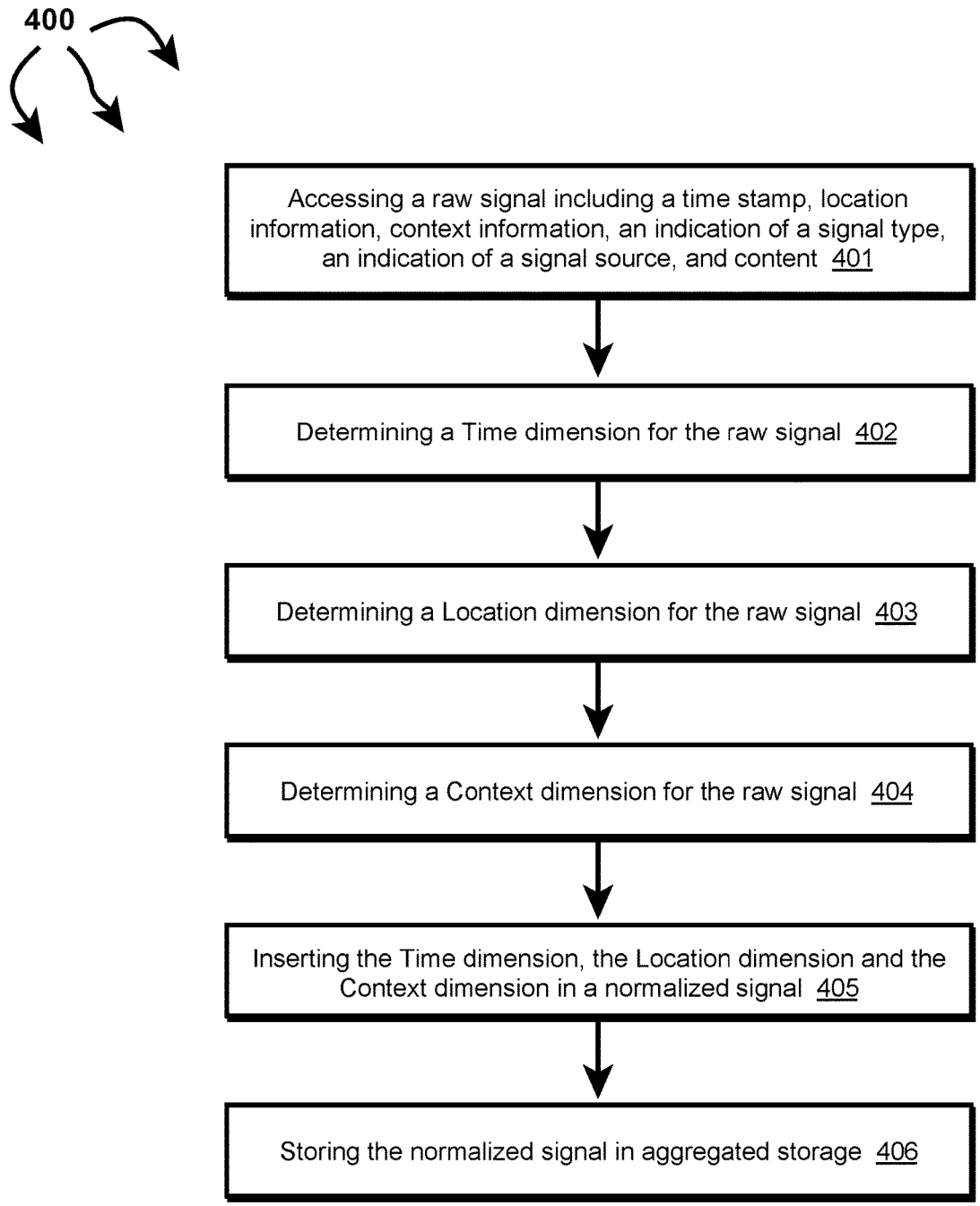
FIG. 4 illustrates a flow chart of an example method for normalizing an ingested signal including time information, location information, and context information.

FIG. 4 illustrates a flow chart of an example method 400 for normalizing an ingested signal including time information, location information, and context information. Method 400 will be described with respect to the components and data in FIG. 3A.

Method 400 includes accessing a raw signal including a time stamp, location information, context information, an indication of a signal type, an indication of a signal source, and content (401). For example, signal transformer 301A can access raw signal 221A. Raw signal 221A includes timestamp 231A, location information 232A (e.g., lat/lon, GPS coordinates, etc.), context information 233A (e.g., text expressly indicating a type of event), signal type 227A (e.g., social media, 911 communication, traffic camera feed, etc.), signal source 228A (e.g., Facebook, twitter, Waze, etc.), and signal content 229A (e.g., one or more of: image, video, text, keyword, locale, etc.).

Method 400 includes determining a Time dimension for the raw signal (402). For example, signal transformer 301A can determine time 223A from timestamp 231A.

Method 400 includes determining a Location dimension for the raw signal (403). For example, signal transformer 301A sends location information 232A to location services 302. Geo cell service 303 can identify a geo cell corresponding to location information 232A. Market service 304 can identify a designated market area (DMA) corresponding to location information 232A. Location services 302 can include the identified geo cell and/or DMA in location 224A. Location services 302 return location 224A to signal transformer 301.

Method 400 includes determining a Context dimension for the raw signal (404). For example, signal transformer 301A sends context information 233A to classification tag service 306. Classification tag service 306 identifies one or more classification tags 226A (e.g., fire, police presence, accident, natural disaster, etc.) from context information 233A. Classification tag service 306 returns classification tags 226A to signal transformer 301A.

Method 400 includes inserting the Time dimension, the Location dimension, and the Context dimension in a normalized signal (405). For example, signal transformer 301A can insert time 223A, location 224A, and tags 226A in normalized signal 222A (a TLC signal). Method 400 includes storing the normalized signal in signal storage (406). For example, signal transformer 301A can store normalized signal 222A in TLC signal storage 307. (Although not depicted, timestamp 231A, location information 232A, and context information 233A can also be included (or remain) in normalized signal 222A).

Method 400 includes storing the normalized signal in aggregated storage (406). For example, signal aggregator 308 can aggregate normalized signal 222A along with other normalized signals determined to relate to the same event. In one aspect, signal aggregator 308 forms a sequence of signals related to the same event. Signal aggregator 308 stores the signal sequence, including normalized signal 222A, in aggregated TLC storage 309 and eventually forwards the signal sequence to event detection infrastructure 103.

Figure 5:
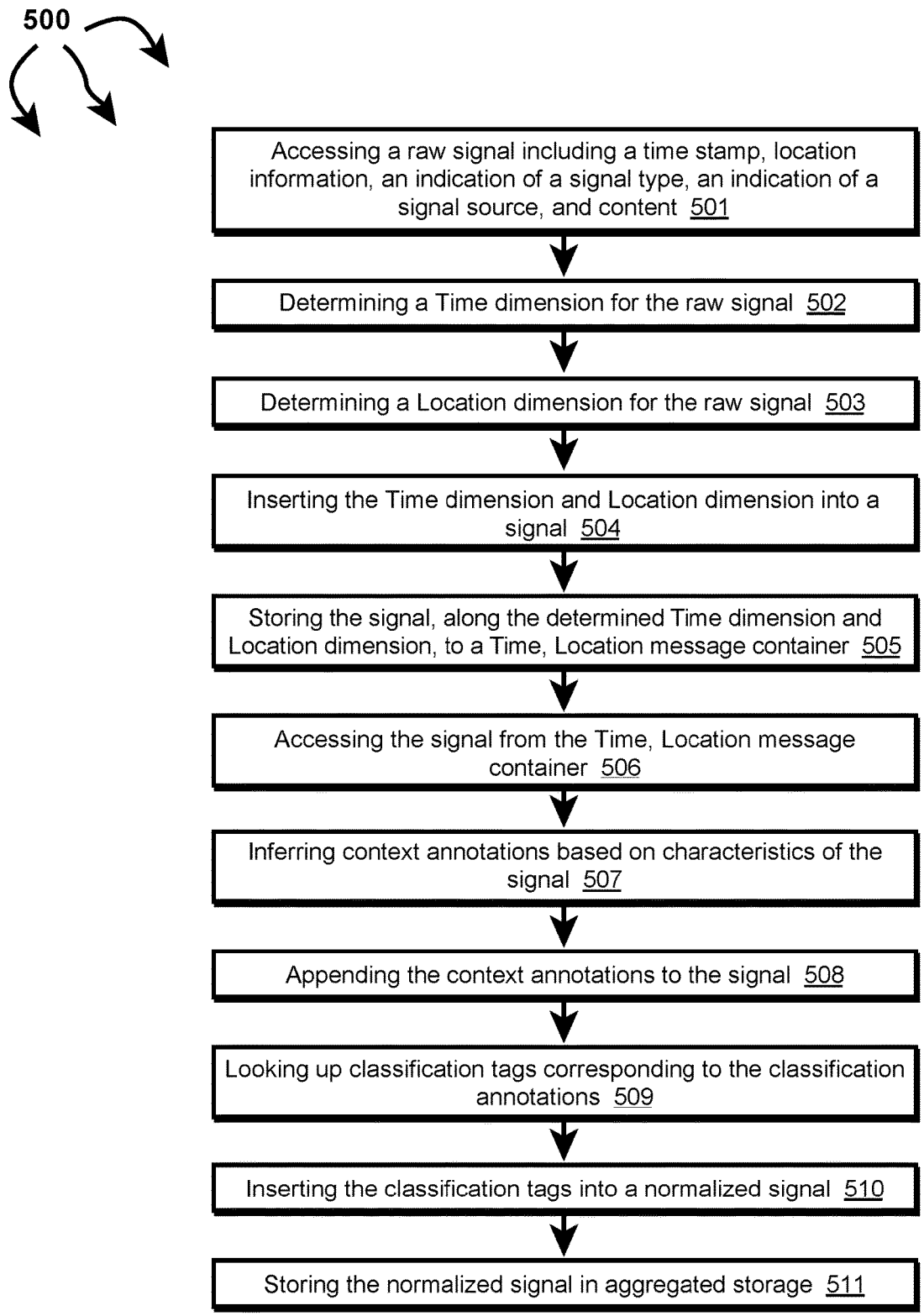
FIG. 5 illustrates a flow chart of an example method for normalizing an ingested signal including time information and location information.

FIG. 5 illustrates a flow chart of an example method 500 for normalizing an ingested signal including time information and location information. Method 500 will be described with respect to the components and data in FIG. 3B.

Method 500 includes accessing a raw signal including a time stamp, location information, an indication of a signal type, an indication of a signal source, and content (501). For example, signal transformer 301B can access raw signal 221B. Raw signal 221B includes timestamp 231B, location information 232B (e.g., lat/lon, GPS coordinates, etc.), signal type 227B (e.g., social media, 911 communication, traffic camera feed, etc.), signal source 228B (e.g., Facebook, twitter, Waze, etc.), and signal content 229B (e.g., one or more of: image, video, audio, text, keyword, locale, etc.).

Method 500 includes determining a Time dimension for the raw signal (502). For example, signal transformer 301B can determine time 223B from timestamp 231B.

Method 500 includes determining a Location dimension for the raw signal (503). For example, signal transformer 301B sends location information 232B to location services 302. Geo cell service 303 can be identify a geo cell corresponding to location information 232B. Market service 304 can identify a designated market area (DMA) corresponding to location information 232B. Location services 302 can include the identified geo cell and/or DMA in location 224B. Location services 302 returns location 224B to signal transformer 301.

Method 500 includes inserting the Time dimension and Location dimension into a signal (504). For example, signal transformer 301B can insert time 223B and location 224B into TL signal 236B. (Although not depicted, timestamp 231B and location information 232B can also be included (or remain) in TL signal 236B). Method 500 includes storing the signal, along with the determined Time dimension and Location dimension, to a Time, Location message container (505). For example, signal transformer 301B can store TL signal 236B to TL signal storage 311. Method 500 includes accessing the signal from the Time, Location message container (506). For example, signal aggregator 308 can access TL signal 236B from TL signal storage 311.

Method 500 includes inferring context annotations based on characteristics of the signal (507). For example, context inference module 312 can access TL signal 236B from TL signal storage 311. Context inference module 312 can infer context annotations 241 from characteristics of TL signal 236B, including one or more of: time 223B, location 224B, type 227B, source 228B, and content 229B. In one aspect, context inference module 212 includes one or more of: NLP modules, audio analysis modules, image analysis modules, video analysis modules, etc. Context inference module 212 can process content 229B in view of time 223B, location 224B, type 227B, source 228B, to infer context annotations 241 (e.g., using machine learning, artificial intelligence, neural networks, machine classifiers, etc.). For example, if content 229B is an image that depicts flames and a fire engine, context inference module 212 can infer that content 229B is related to a fire. Context inference 212 module can return context annotations 241 to signal aggregator 208.

Method 500 includes appending the context annotations to the signal (508). For example, signal aggregator 308 can append context annotations 241 to TL signal 236B. Method 500 includes looking up classification tags corresponding to the classification annotations (509). For example, signal aggregator 308 can send context annotations 241 to classification tag service 306. Classification tag service 306 can identify one or more classification tags 226B (a Context dimension) (e.g., fire, police presence, accident, natural disaster, etc.) from context annotations 241. Classification tag service 306 returns classification tags 226B to signal aggregator 308.

Method 500 includes inserting the classification tags in a normalized signal (510). For example, signal aggregator 308 can insert tags 226B (a Context dimension) into normalized signal 222B (a TLC signal). Method 500 includes storing the normalized signal in aggregated storage (511). For example, signal aggregator 308 can aggregate normalized signal 222B along with other normalized signals determined to relate to the same event. In one aspect, signal aggregator 308 forms a sequence of signals related to the same event. Signal aggregator 308 stores the signal sequence, including normalized signal 222B, in aggregated TLC storage 309 and eventually forwards the signal sequence to event detection infrastructure 103. (Although not depicted, timestamp 231B, location information 232C, and context annotations 241 can also be included (or remain) in normalized signal 222B).

Figure 6:
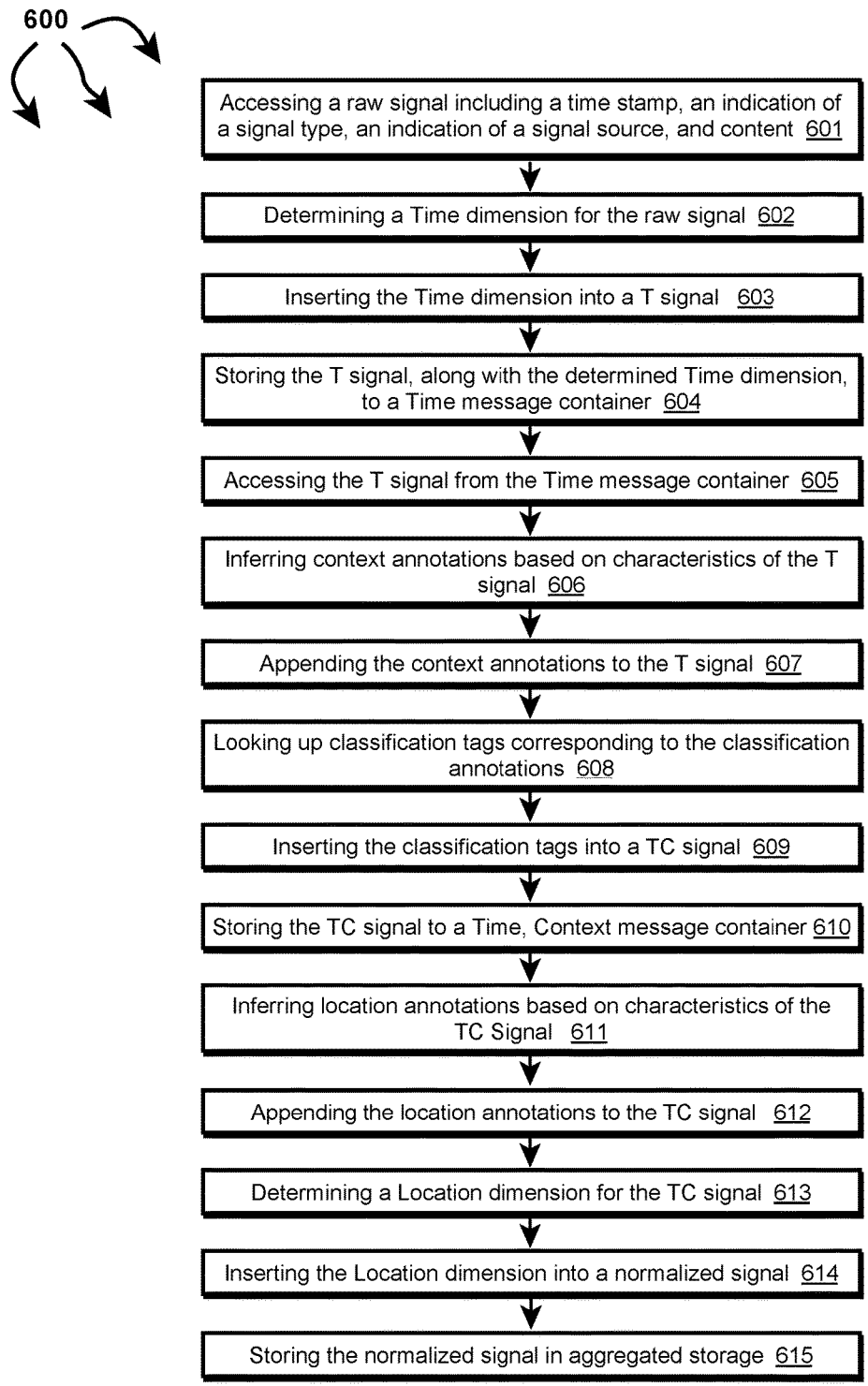
FIG. 6 illustrates a flow chart of an example method for normalizing an ingested signal including time information.

FIG. 6 illustrates a flow chart of an example method 600 for normalizing an ingested signal including time information. Method 600 will be described with respect to the components and data in FIG. 3C.

Method 600 includes accessing a raw signal including a time stamp, an indication of a signal type, an indication of a signal source, and content (601). For example, signal transformer 301C can access raw signal 221C. Raw signal 221C includes timestamp 231C, signal type 227C (e.g., social media, 911 communication, traffic camera feed, etc.), signal source 228C (e.g., Facebook, twitter, Waze, etc.), and signal content 229C (e.g., one or more of: image, video, text, keyword, locale, etc.).

Method 600 includes determining a Time dimension for the raw signal (602). For example, signal transformer 301C can determine time 223C from timestamp 231C. Method 600 includes inserting the Time dimension into a T signal (603). For example, signal transformer 301C can insert time 223C into T signal 234C. (Although not depicted, timestamp 231C can also be included (or remain) in T signal 234C).

Method 600 includes storing the T signal, along with the determined Time dimension, to a Time message container (604). For example, signal transformer 301C can store T signal 236C to T signal storage 313. Method 600 includes accessing the T signal from the Time message container (605). For example, signal aggregator 308 can access T signal 234C from T signal storage 313.

Method 600 includes inferring context annotations based on characteristics of the T signal (606). For example, context inference module 312 can access T signal 234C from T signal storage 313. Context inference module 312 can infer context annotations 242 from characteristics of T signal 234C, including one or more of: time 223C, type 227C, source 228C, and content 229C. As described, context inference module 212 can include one or more of: NLP modules, audio analysis modules, image analysis modules, video analysis modules, etc. Context inference module 212 can process content 229C in view of time 223C, type 227C, source 228C, to infer context annotations 242 (e.g., using machine learning, artificial intelligence, neural networks, machine classifiers, etc.). For example, if content 229C is a video depicting two vehicles colliding on a roadway, context inference module 212 can infer that content 229C is related to an accident. Context inference 212 module can return context annotations 242 to signal aggregator 208.

Method 600 includes appending the context annotations to the T signal (607). For example, signal aggregator 308 can append context annotations 242 to T signal 234C. Method 600 includes looking up classification tags corresponding to the classification annotations (608). For example, signal aggregator 308 can send context annotations 242 to classification tag service 306. Classification tag service 306 can identify one or more classification tags 226C (a Context dimension) (e.g., fire, police presence, accident, natural disaster, etc.) from context annotations 242. Classification tag service 306 returns classification tags 226C to signal aggregator 208.

Method 600 includes inserting the classification tags into a TC signal (609). For example, signal aggregator 308 can insert tags 226C into TC signal 237C. Method 600 includes storing the TC signal to a Time, Context message container (610). For example, signal aggregator 308 can store TC signal 237C in TC signal storage 314. (Although not depicted, timestamp 231C and context annotations 242 can also be included (or remain) in normalized signal 237C).

Method 600 includes inferring location annotations based on characteristics of the TC signal (611). For example, location inference module 316 can access TC signal 237C from TC signal storage 314. Location inference module 316 can include one or more of: NLP modules, audio analysis modules, image analysis modules, video analysis modules, etc. Location inference module 316 can process content 229C in view of time 223C, type 227C, source 228C, and classification tags 226C (and possibly context annotations 242) to infer location annotations 243 (e.g., using machine learning, artificial intelligence, neural networks, machine classifiers, etc.). For example, if content 229C is a video depicting two vehicles colliding on a roadway, the video can include a nearby street sign, business name, etc. Location inference module 316 can infer a location from the street sign, business name, etc. Location inference module 316 can return location annotations 243 to signal aggregator 308.

Method 600 includes appending the location annotations to the TC signal with location annotations (612). For example, signal aggregator 308 can append location annotations 243 to TC signal 237C. Method 600 determining a Location dimension for the TC signal (613). For example, signal aggregator 308 can send location annotations 243 to location services 302. Geo cell service 303 can identify a geo cell corresponding to location annotations 243. Market service 304 can identify a designated market area (DMA) corresponding to location annotations 243. Location services 302 can include the identified geo cell and/or DMA in location 224C. Location services 302 returns location 224C to signal aggregation services 308.

Method 600 includes inserting the Location dimension into a normalized signal (614). For example, signal aggregator 308 can insert location 224C into normalized signal 222C. Method 600 includes storing the normalized signal in aggregated storage (615). For example, signal aggregator 308 can aggregate normalized signal 222C along with other normalized signals determined to relate to the same event. In one aspect, signal aggregator 308 forms a sequence of signals related to the same event. Signal aggregator 308 stores the signal sequence, including normalized signal 222C, in aggregated TLC storage 309 and eventually forwards the signal sequence to event detection infrastructure 103. (Although not depicted, timestamp 231B, context annotations 242, and location annotations 243, can also be included (or remain) in normalized signal 222C).

Figure 3D:
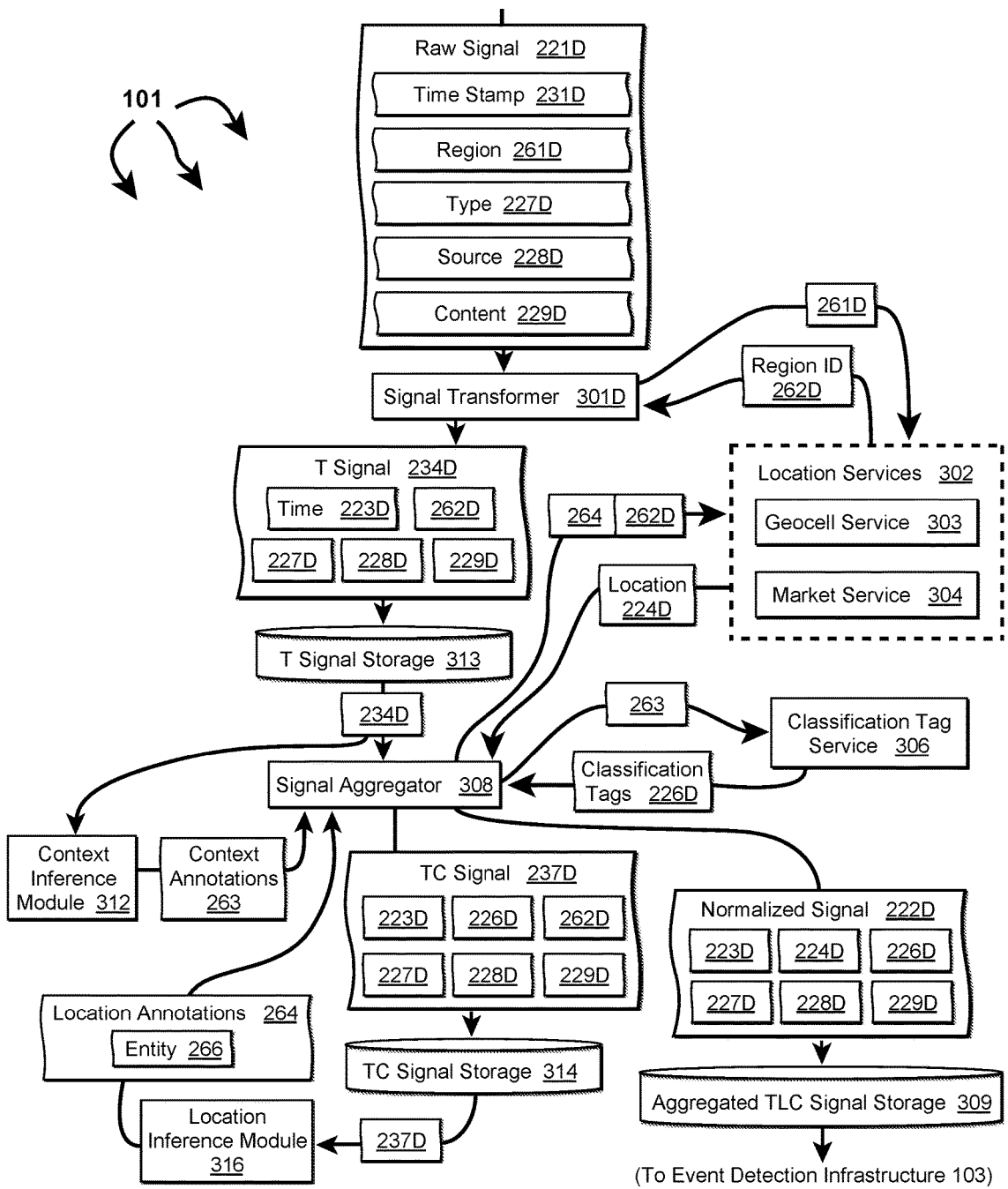
Figure 7:
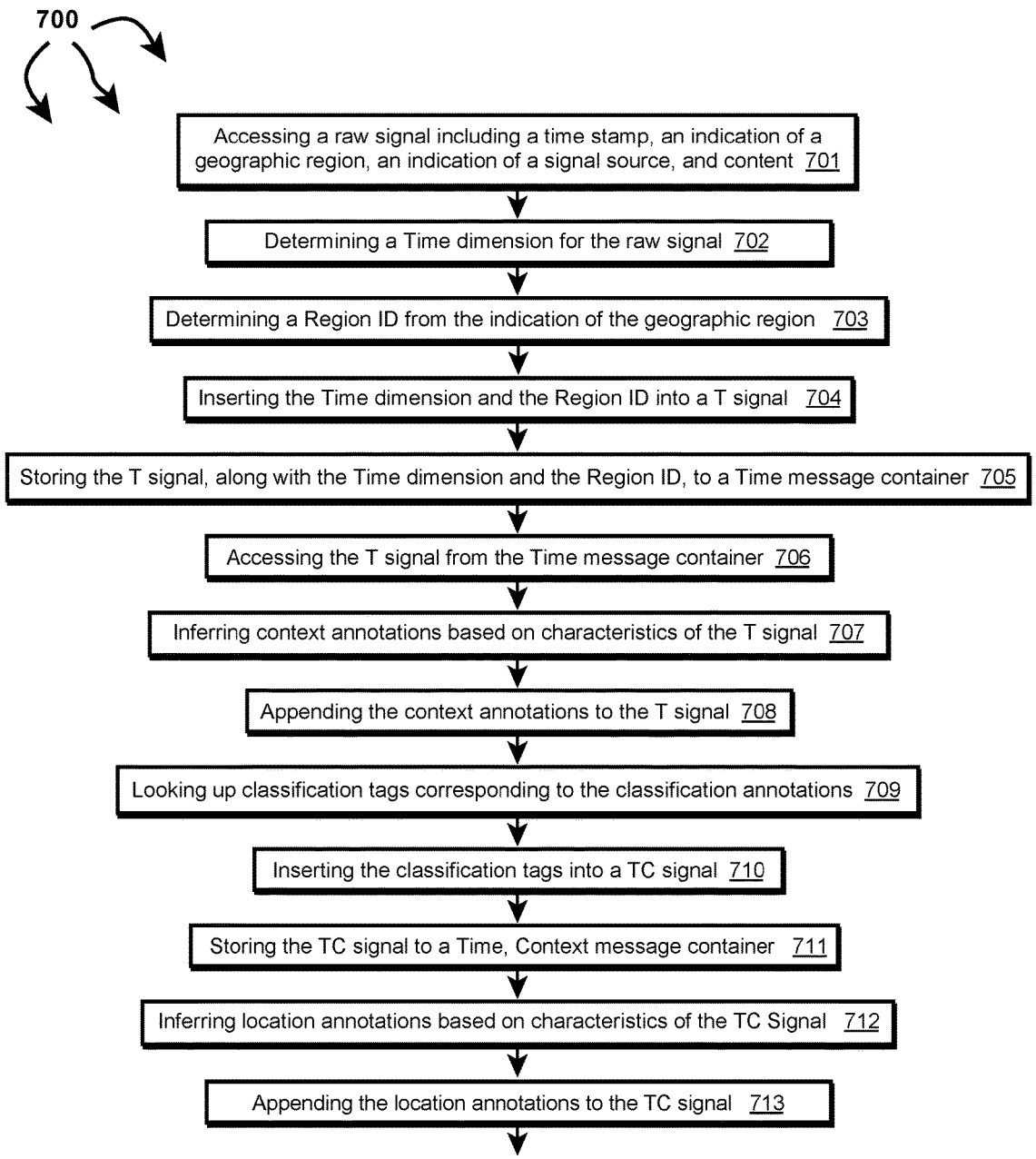
FIG. 7 illustrates a flow chart of an example method for normalizing an ingested signal including time information.
Figure 7:
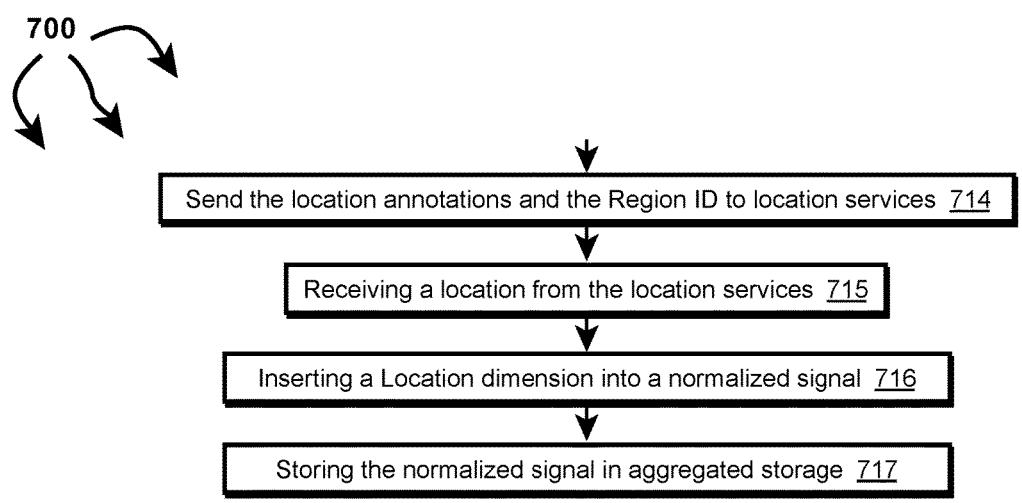

FIG. 7 illustrates a flow chart of another example method 700 for normalizing an ingested signal including time information and a geographic region. Method 700 will be described with respect to the components and data in FIG. 3D.

Method 700 includes accessing a raw signal including a time stamp, an indication of a geographic region, an indication of a signal type, an indication of a signal source, content (701). For example, signal transformer 301C can access raw signal 221C. Raw signal 221C includes timestamp 231D, region 261D, signal type 227D (e.g., social media, 911 communication, traffic camera feed, etc.), signal source 228D (e.g., Facebook, twitter, Waze, etc.), and signal content 229D (e.g., one or more of: image, video, text, keyword, locale, etc.). Region 261D can be the name of a city, a county, a metropolitan area, a province, a territory, a geographic feature, another defined geographic area (e.g., "tristate area", "Wasatch Front", "San Fernando Valley", etc.). Region 261D provides a generalized hint in regard to the originating location of raw signal 221C.

Method 700 includes determining a time for the raw signal (702). For example, signal transformer 301D can convert timestamp 231D into time 223D. Method 700 includes determining a Region ID from the indication of geographic region (703). For example, signal transformer 301D can submit region 261D to location services 302. Market service 304 converts region 261D to a series of coordinates defining a polygon that represents region 261D. Market service 304 translates the polygon to a corresponding plurality of geo cells representing region 261D. Market service 304 formulates region ID 262 to identify the plurality of geo cells. The plurality of geo cells can include geo cells of different precisions.

Method 700 includes inserting the Time and the Region ID into a T signal (704). For example, signal transformer 301D can insert time 223D and Region ID 262D into T signal 234D. (Although not depicted, timestamp 231D and region 261D can also be included (or remain) in T signal 234D).

Method 700 includes storing the T signal, along with the determined Time and Region ID, to a Time topic (705). For example, signal transformer 301D can store T signal 234D to T signal storage 313. Method 700 includes accessing the T signal from the Time topic (706). For example, signal aggregator 308 can access T signal 234D from T signal storage 313.

Method 700 includes inferring context annotations based on characteristics of the T signal (707). For example, context inference module 312 can access T signal 234D from T signal storage 313. Context inference module 312 can infer context annotations 263 from characteristics of T signal 234D, including one or more of: time 223D, Region ID 262D, type 227D, source 228D, and content 229D. As described, context inference module 212 can include one or more of: NLP modules, audio analysis modules, image analysis modules, video analysis modules, etc. Context inference module 212 can process content 229D in view of time 223C, Region ID 262D, type 227D, source 228D, to infer context annotations 263 (e.g., using machine learning, artificial intelligence, neural networks, machine classifiers, etc.). For example, if content 229C is an image including a fire truck with flames in the background, context inference module 212 can infer that content 229C is related to fire. Context inference 212 module can return context annotations 242 to signal aggregator 308.

Method 700 includes appending the context annotations to the T signal (708). For example, signal aggregator 308 can append context annotations 263 to T signal 234D. Method 600 includes looking up classification tags corresponding to the classification annotations (709). For example, signal aggregator 308 can send context annotations 263 to classification tag service 306. Classification tag service 306 can identify one or more classification tags 226D (e.g., fire, police presence, accident, natural disaster, etc.) from context annotations 263. Classification tag service 306 returns classification tags 226D to signal aggregator 208.

Method 700 includes inserting the classification tags into a TC signal (710). For example, signal aggregator 308 can insert tags 226D into TC signal 237D. Method 600 includes storing the TC signal to a Time, Context topic (711). For example, signal aggregator 308 can store TC signal 237D in TC signal storage 314. (Although not depicted, timestamp 231C, region 261D, and context annotations 263 can also be included (or remain) in TC signal 237D).

Method 700 includes inferring location annotations based on characteristics of the TC signal (712). For example, location inference module 316 can access TC signal 237D from TC signal storage 314. Location inference module 316 can include one or more of: NLP modules, audio analysis modules, image analysis modules, video analysis modules, etc. Location inference module 316 can process content 229D in view of time 223D, Region ID 262D, type 227D, source 228D, and classification tags 226D (and possibly context annotations 263) to infer location annotations 264 (e.g., using machine learning, artificial intelligence, neural networks, machine classifiers, etc.).

As described, location inference module 316 can recognize named entities, such as, for example, a business, an organization, a place, or a street. For example, location inference module 316 can recognize entity 266 (as well as other entities, such as, for example, multiple organizations) contained content 229D.

Method 700 includes appending the location annotations to the TC signal with location annotations (713). For example, signal aggregator 308 can append location annotations 264 to TC signal 237D. Method 700 includes sending the location annotations and the region ID to location services (714). For example, signal aggregator 308 can send location annotations 264, including entity 266, and Region ID 262D, to location services 302. Geo cell service 303 can identify one or more geo cells geo cell from location annotations 264 and Region ID 262 (e.g., using Region ID 262 as a hint). In one aspect, an identified geo cell is a geohash of precision 7, 8, 9, 10, 11, or 12 (i.e., more precise than Region ID 262D). Location services 302 can include the geo cell or geohash in location 224D. Location services 302 can return location 224D to signal aggregator 308. Method 700 includes receiving a location from the location services (715). For example, signal aggregator 308 can receive location 224D from location services 302.

Method 700 includes inserting a location dimension into a normalized signal (716). For example, signal aggregator 308 can insert location 224D into normalized signal 222D. Method 700 includes storing the normalized signal in aggregated storage (717). For example, signal aggregator 308 can aggregate normalized signal 222D along with other normalized signals determined to relate to the same event. In one aspect, signal aggregator 308 forms a sequence of signals related to the same event. Signal aggregator 308 stores the signal sequence, including normalized signal 222D, in aggregated TLC storage 309 and eventually forwards the signal sequence to event detection infrastructure 103. (Although not depicted, timestamp 231D, region 261D, context annotations 263, and location annotations 264, can also be included (or remain) in normalized signal 222B).

In other aspects, location is determined prior to context when a T signal is accessed. A location (e.g., geo cell and/or DMA/Region) and/or location annotations are used when inferring context annotations.

Accordingly, location services 302 can identify a geo cell and/or DMA/Region for a signal from location information in the signal and/or from inferred location annotations. Similarly, classification tag service 306 can identify classification tags for a signal from context information in the signal and/or from inferred context annotations.

Signal aggregator 308 can concurrently handle a plurality of signals in a plurality of different stages of normalization. For example, signal aggregator 308 can concurrently ingest and/or process a plurality T signals, a plurality of TL signals, a plurality of TC signals, and a plurality of TLC signals. Accordingly, aspects of the invention facilitate acquisition of live, ongoing forms of data into an event detection system with signal aggregator 208 acting as an "air traffic controller" of live data. Signals from multiple sources of data can be aggregated and normalized for a common purpose (of event detection). Data ingestion, event detection, and event notification process data through multiple stages of logic with concurrency.

As such, a unified interface can handle incoming signals and content of any kind. The interface can handle live extraction of signals across dimensions of time, location, and context. In some aspects, heuristic processes are used to determine one or more dimensions. Acquired signals can include text and images as well as live-feed binaries, including live media in audio, speech, fast still frames, video streams, etc.

Signal normalization enables the world's live signals to be collected at scale and analyzed for detection and validation of live events happening globally. A data ingestion and event detection pipeline aggregates signals and combines detections of various strengths into truthful events. Thus, normalization increases event detection efficiency facilitating event detection closer to "live time" or at "moment zero".

It may be that geo cell service 303 and/or market service 304 are integrated with and/or interoperate with and/or include geo cell database 111. As such, geo cell database 111 can be used to determine Location dimension as well as to detect events.

Named Entity Recognition

Figure 8A:
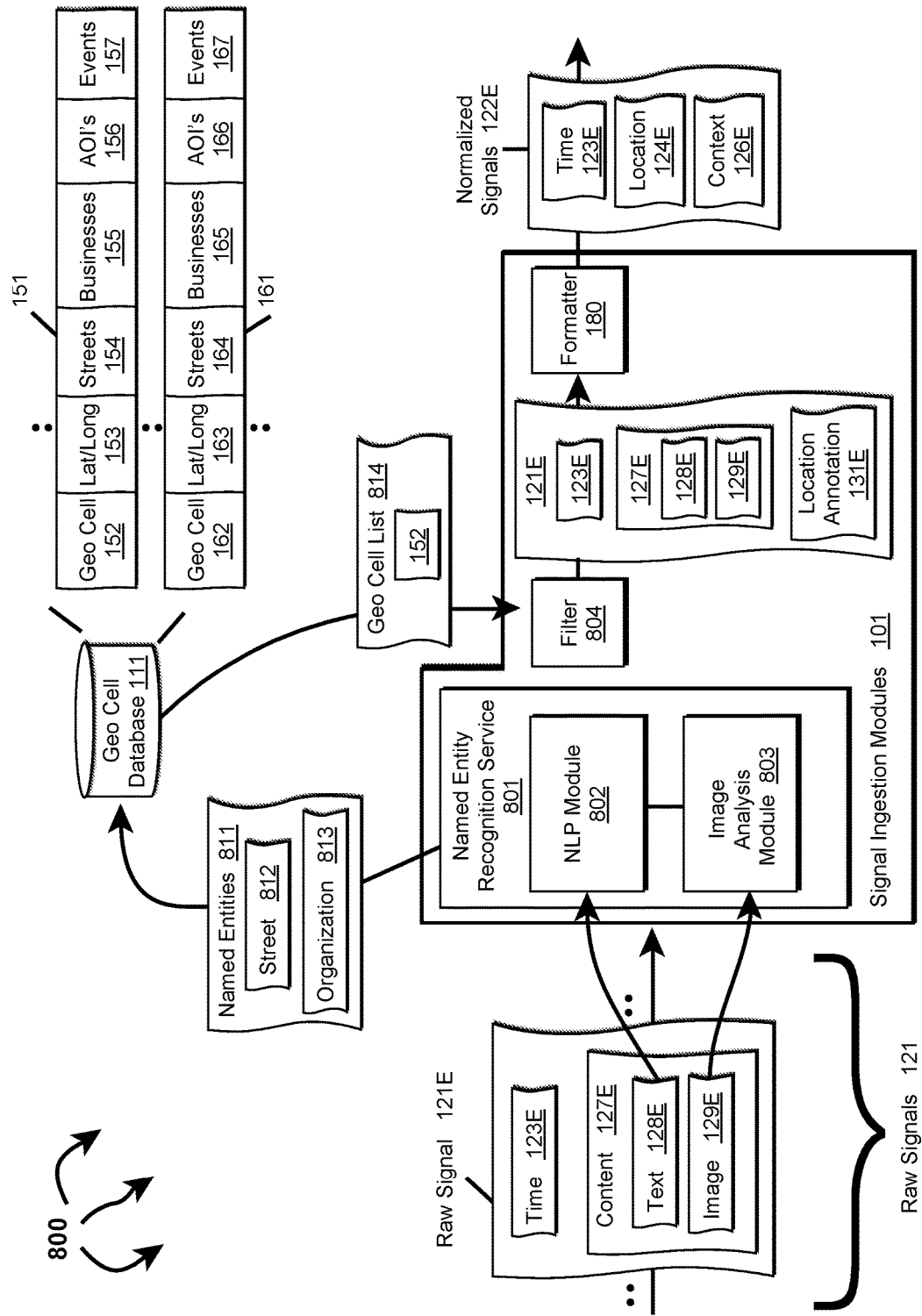
FIG. 8A illustrates an example architecture that facilitates named entity recognition and determining signal location.

FIG. 8A illustrates an example architecture 800 that facilitates named entity recognition and determining signal location. Turning to FIG. 8A, signal ingestion modules 101 can include named entity recognition service 801 and filter 804. In general, named entity recognition service 801 can recognize named entities in signal content of an ingested signal. Named entity recognition service 801 can query geo cell database 111 with recognized named entities. Geo cell database 111 can attempt to match named entities to named entities in geo cell entries. A match between a recognized named entity and a geo cell named entity indicates that the signal possibly originated in the geo cell. Multiple matches, for example, to multiple organziations, can be detected. A list of possibly originating geo cells can be returned to filter 804.

Filter 804 can filter out geo cells that are less probable originating locations (e.g., using heuristics, machine learning, artificial intelligence, etc.). Filter 204 can annotate the ingested signal with a location annotation based on geo cells that are more probable originating locations of the ingested signal. Subsequent modules, such as, formatter 180 can determine an originating location of an ingested signal from the location annotation. The originating location can be included in a Location dimension.

Named entity recognition service 801 can consume signals that lack expressly defined location. Named entity recognition service 801 recognizes named entities from signal content and associates a confidence score with each recognized named entity. Named entity recognition service 801 can include heuristics, filters, thresholds, etc. to refine recognized named entities into a number of higher value named entities (e.g., removing recognized named entities having lower confidence scores). Named entity recognition service 801 can search geo cell database 111 with the higher value named entities.

For example, signal ingestion modules 101 can ingest raw signal 121E. As depicted, raw signal 121E includes time 123E and content 127E. Content 127E further includes text 128E and image 129E. During ingestion, signal ingestion modules 101 can send raw signal 121E to named entity recognition service 801. More specifically, text 128E can be sent to NLP module 802 and image 129E can be sent to image analysis module 803. NLP module 802 can recognize one or more named entities contained in text 128E. Image analysis module 803 (e.g., using optical character recognition (OCR)) can recognize characters included in image 129B. Image analysis modules 803 can convert the recognized characters into additional text. NLP module 802 can also recognize one or more named entities in the additional text. In one aspect, NLP module 802 recognizes an organizational logo (e.g., Wal-Mart®, Nordstrom®, Starbucks®, etc.).

Named entity recognition service 801 can convert and consolidate named entities into a format compatible with geo cell database 111, such as, for example, search query and type. For example, named entity recognition service 801 can recognize, format, and consolidate named entities recognized from text 128E and image 129E into named entities 811. Named entities 811 can include a query for any geo cells including street 812 and organization 813. Named entity recognition service 801 can send named entities 811 to geo cell database 111.

Geo cell database 111 attempts to match street 812 and organization 813 to fields in geo cell entries. Geo cell database 111 can detect that street 812 matches a street in streets 154 and that organization 813 matches an organization in organizations 155. Geocell database 111 can return geo cell list 814, including geo cell 152, to filter 804.

When a geo cell query includes multiple recognized named entities, geo cell database 111 attempts to match the multiple recognized named entities to a signal geo cell of a specified precision (e.g., a single geohash of precision 7, 8, or 9). If a single geo cell match is detected, the geo cell is returned to filter 804. If a single geo cell match is not detected, geo cell database 111 returns a list of geo cells (e.g., geohashes of precision 7, 8, or 9) to filter 804. Each geo cell in the list of geo cells can include at least one and (preferably) more or (more preferably) all of the multiple recognized geocells.

Further, additional adjacent geo cells can be checked. For example, if street 812 is matched to a street in streets 154 but organization 813 is not matched to an organization in organizations 155, geo cell database 111 can check other geo cells left, right, above, below, or the corners, etc. of geo cell 152 for a match to organization 813. If organization 813 is matched to an organization in an adjacent geo cell, geo cell 152 and the adjacent geo cell can be returned to filter 804.

If matches in adjacent geo cells of a specified precision are not detected, geo cell precision can be reduced. For example, geohash precision can be reduced to precision 6 (1200 m). Geo cell database 111 attempts to match the multiple entities to a single less precise geo cell. If a single less precise geo cell match is detected, the single less precise geo cell can be returned to filter 804. If a match to a less precise geo cell is not detected, any matching geo cell of the specified (higher) precision can be returned to filter 804.

It may be that multiple recognized entities are matched to a plurality of different geo cells in geographically diverse locations, such as, different (and non-adjacent) states. Each of the matching geo cells can be returned to filter 804. Filter 804 can listen in each geo cell for additional signals having sufficiently similar context dimension. For example, if an ingested signal was tagged as a fire, filter 804 can listen in each geo cell for additional signals tagged as a fire.

When a geo cell query includes a single recognized named entity, geo cell database 111 attempts to match the single recognized named entity to a signal geo cell (e.g., a single geohash of precision 7, 8, or 9). If the single recognized named entity is detected in multiple geo cells, the multiple geo cells are returned to filter 804. Filter 804 can listen in each geo cell for additional signals having sufficiently similar context dimension. For example, if an ingested signal was tagged as an accident, filter 804 can listen in each geo cell for additional signals tagged as an accident.

Based on geo cells included in geo cell list 814, filter 804 can formulate location annotation 131E. Location annotation 131E provides location information about raw signal 121E. Formatter 180 (or other pipeline modules) can use location annotation 181 to infer/derive Location dimension 124E. Signal ingestion modules 101 can output normalized signal 122E including Time dimension 123E, Location dimension 124E, and Context dimension 126E. Signal ingestion modules 101 can send normalized signal 122E to event detection infrastructure 103.

Figure 8B:
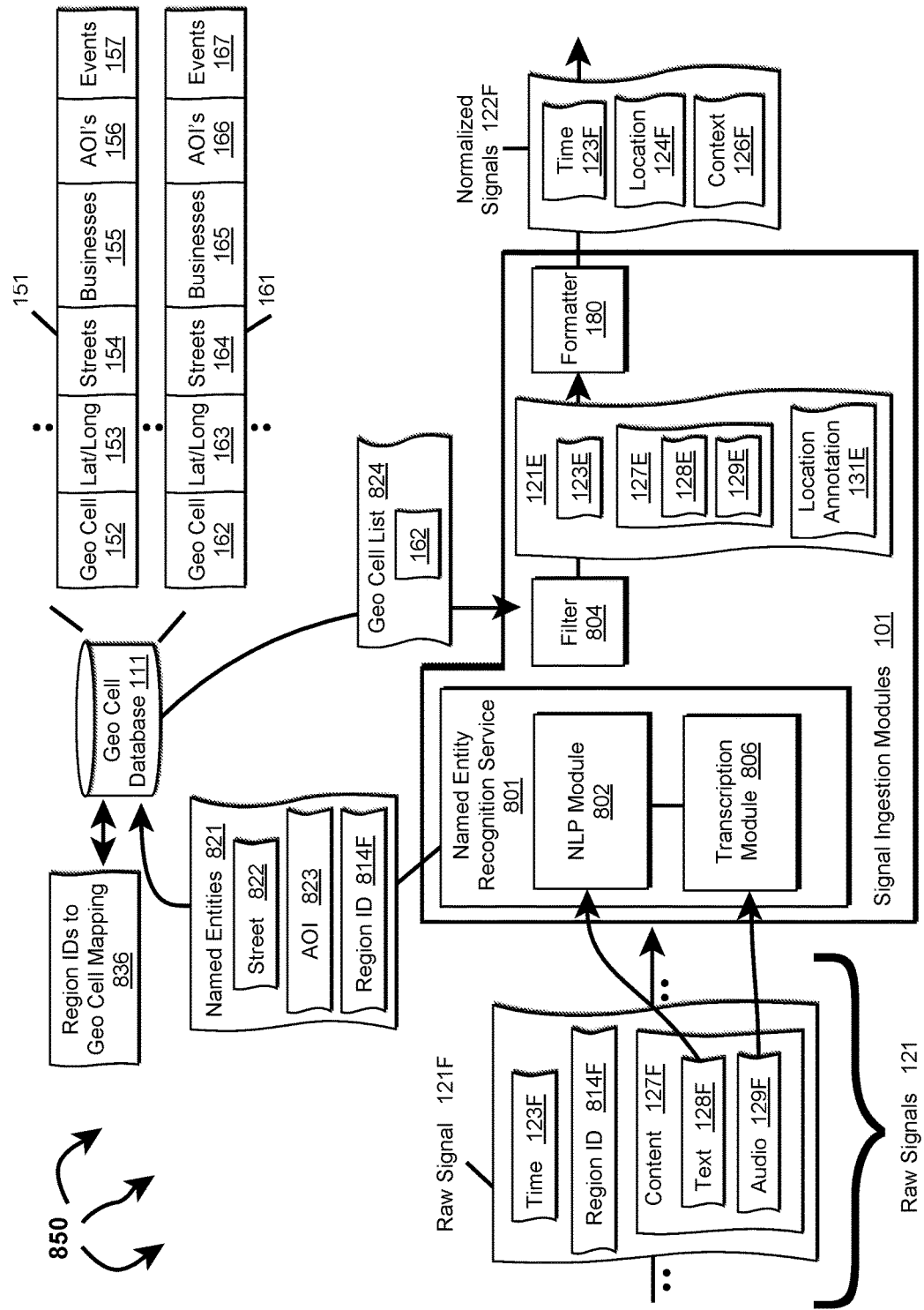
FIG. 8B illustrates an example architecture that facilitates named entity recognition and determining signal location.

FIG. 8B illustrates an example architecture 850 that facilitates named entity recognition and determining signal location. Turning to FIG. 8B, computer architecture 850 further includes region IDs to geo cells mapping 836. In one aspect, region identifiers are less precise geo cells (e.g., geo hashes of level 4, 5, or 6) relative to geo cells in included in geo cell entries (e.g., geo hashes of level 7, 8, or 9). Based in the hierarchical nature of geo cells, region IDs can be map to a set of more precise geo cells. Using region IDs narrows down geo cells that are checked for recognized named entities to those geo cells included in the region.

Signal ingestion modules 101 can also include functionality to determine a region ID from a region name, such as, for example, a city (e.g., "San Francisco"), a county ("King County"), a metropolitan area, a province, a territory, a geographic feature, another defined geographic area (e.g., "tristate area", "Wasatch Front", "San Fernando Valley", etc.). In one aspect, a region name is converted into a region ID representing a combination of multiple adjacent less precise (and possibly different precision) geo cells. In another aspect, raw signal 121F includes other location hints that, while not dispositive in regards to an originating location of raw signal 121F, can assist in narrowing down a geo cell list.

Named entity recognition service 801 also includes transcription module 806.

Signal ingestion modules 101 can ingest raw signal 121F. As depicted, raw signal 121F includes time 123F, region ID 814F, and content 127F. Content 127F further includes text 128F and audio 129F. During ingestion, signal ingestion modules 101 can send raw signal 121F to named entity recognition service 801. More specifically, text 128F can be sent to NLP module 802 and audio 129F can be sent to transcription module 806. NLP module 802 can recognize one or more named entities contained in text 128F. Transcription module 806 can transcribe audio 129F into additional text. NLP module 802 can also recognize one or more named entities in the additional text. In one aspect, NLP module 802 recognizes an organizational logo (e.g., Wal-Mart®, Nordstrom®, Starbucks®, etc.).

Named entity recognition service 801 can convert and consolidate named entities into a format compatible with geo cell database 111, such as, for example, search query and type. For example, named entity recognition service 801 can recognize, format, and consolidate named entities recognized from text 128F and image 129F into named entities 821. Named entities 821 can include a query for any geo cells including street 822 and AOI 823 in geo cells in region ID 814F (or narrowed down by other location hints). Named entity recognition service 801 can send named entities 821 to geo cell database 111.

Geo cell database 111 refers to region IDs to geo cells mapping 836 to determine what geo cells are included in region ID 814F (or are associated with other location hints). Geo cell database then attempts to match street 822 and AOI 823 to geo cell entries for geo cells in region ID 814F (or associated with the other location hints). Geo cell database 111 can detect that street 822 matches a street in streets 164 and that AOI 823 matches an AOI in AOIs 166. Geocell database 111 can return geo cell list 824, including geo cell 162, to filter 804.

Since geo cell matching is performed within a region ID (and possibly based on other location hints), possible originating locations of raw signal 121F are narrowed down. If multiple geo cells are matched, operations similar to those described with respect to computer architecture 800 can be used to further narrow down geo cells.

Accordingly, based on geo cells included in geo cell list 824, filter 804 can formulate location annotation 131F. Location annotation 131F provides location information about raw signal 121F. Formatter 180 (or other pipeline modules) can use location annotation 131F to infer/derive Location dimension 124F. Signal ingestion modules 101 can output normalized signal 122F including Time dimension 123F, Location dimension 124F, and Context dimension 126F. Signal ingestion modules 101 can send normalized signal 122F to event detection infrastructure 103.

As described, on an ongoing basis, concurrently with signal ingestion (and also essentially in real-time), event detection infrastructure 103 detects events from information contained in normalized signals 122. Event detection infrastructure 103 can detect an event from a single normalized signal 122 or from multiple normalized signals 122.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:
1. A method comprising:
ingesting a raw signal;
deriving a partially normalized signal from the raw signal;
accessing a list of one or more geo cells where the raw signal potentially originated;
formulating a location annotation identifying a geo cell from among the one or more geo cells;
annotating the partially normalized signal with the location annotation;
determining a location in a two dimensional space from the location annotation; and
inserting the location into the partially normalized signal to form a fully normalized signal.

2. The method of claim 1, wherein accessing the list of one or more geo cells where the raw signal potentially originated comprises:
recognizing a named entity in content of the raw signal;
querying a geo cell database with the named entity; and
receiving the list of one or more geo cells from the geo cell database.

3. The method of claim 2, wherein ingesting the raw signal comprises ingesting a raw signal that includes a region identifier;
wherein querying the geo cell database with the named entity comprises querying the geo cell database with the named entity and the region identifier; and
wherein receiving the list of one or more geo cells comprises receiving a list of one or more geo cells included in a geographic region derived from the region identifier.

4. The method of claim 2, wherein recognizing the named entity comprises recognizing one of: a business, an organization, a place, an event, an Area of Interest (AoI), or a street.

5. The method of claim 2, wherein recognizing the named entity comprises recognizing the named entity in at least one of: text contained in the raw signal, an image contained in the raw signal, or audio contained in the raw signal.

6. The method of claim 1, wherein formulating the location annotation identifying the geo cell comprises formulating the location annotation in view of a probability the raw signal originated within the geo cell.

7. The method of claim 1, further comprising:
sending the normalized signal to an event detection infrastructure; and
detecting an event from characteristics of the normalized signal.

8. The method of claim 1, wherein ingesting the raw signal comprises ingesting one of: a social signal, a web signal, or a streaming signal.

9. The method of claim 1, wherein formulating the location annotation identifying the geo cell comprises formulating the location annotation containing the geo cell; and
wherein determining the location in the two dimensional space from the location annotation comprises determining the location in the two dimensional space from the geo cell.

10. The computer system of claim 1, wherein the instructions configured to formulate the location annotation identifying the geo cell comprise instructions configured to formulate the location annotation containing the geo cell; and
wherein the instructions configured to determine the location in the two dimensional space from the location annotation comprise instructions configured to determine the location in the two dimensional space from the geo cell.

11. A computer system comprising:
a processor;

system memory coupled to the processor and storing instructions configured to cause the processor to:

ingest a raw signal;

derive a partially normalized signal from the raw signal;

access a list of one or more geo cells where the raw signal potentially originated;

formulate a location annotation identifying a geo cell from among the one or more geo cells;

annotate the partially normalized signal with the location annotation;

determine a location in a two dimensional space from the location annotation; and insert the location into the partially normalized signal to form a fully normalized signal.

12. The computer system of claim 11, wherein the instructions configured to access the list of one or more geo cells where the raw signal potentially originated comprises instructions configured to:

recognize a named entity in content of the raw signal;

query a geo cell database with the named entity; and receive the list of one or more geo cells from the geo cell database.

13. The computer system of claim 12, wherein the instructions configured to ingest the raw signal comprise instructions configured to ingest the raw signal that includes a region identifier;

wherein the instructions configured to query the geo cell database with the named entity comprise instructions configured to query the geo cell database with the named entity and the region identifier; and wherein the instructions configured to receive the list of one or more geo cells comprise instructions configured to receive the list of one or more geo cells included in a geographic region derived from the region identifier.

14. The computer system of claim 12, wherein the instructions configured to recognize the named entity comprise instructions configured to recognize one of: a business, an organization, a place, an event, an Area of Interest (AoI), or a street.

15. The computer system of claim 12, wherein the instructions configured to recognize the claimed entity comprise instructions configured to recognize the named entity in at least one of: text contained in the raw signal, an image contained in the raw signal, or audio contained in the raw signal.

16. The computer system of claim 11, wherein the instructions configured to formulate the location annotation identifying the geo cell comprise instructions configured to formulate the location annotation in view of a probability the raw signal originated within the geo cell.

17. The computer system of claim 11, further comprising instructions configured to:

send the normalized signal to an event detection infrastructure; and detect an event from characteristics of the normalized signal.

18. The computer system of claim 11, wherein the instructions configured to ingest the raw signal comprise instructions configured to ingest one of: a social signal, a web signal, or a streaming signal.

* * * * *